US011942744B2

(12) United States Patent
Tatzel et al.

(10) Patent No.: US 11,942,744 B2
(45) Date of Patent: Mar. 26, 2024

(54) METHOD FOR PRODUCING A HIGH-FREQUENCY CONNECTOR AND ASSOCIATED APPARATUS

(71) Applicant: Rosenberger Hochfrequenztechnik GmbH & Co. KG, Fridolfing (DE)

(72) Inventors: Frank Tatzel, Ostermiething (AT); Hauke Schütt, Bünsdorf (DE); Alexandra Henniger-Ludwig, Munich (DE)

(73) Assignee: ROSENBERGER HOCHFREQUENZTECHNIK GMBH & CO. KG, Fridofing (DE)

( * ) Notice: Subject to any disclaimer, the term of this patent is extended or adjusted under 35 U.S.C. 154(b) by 865 days.

(21) Appl. No.: 16/975,862

(22) PCT Filed: Feb. 4, 2019

(86) PCT No.: PCT/EP2019/052563
§ 371 (c)(1),
(2) Date: Aug. 26, 2020

(87) PCT Pub. No.: WO2019/162067
PCT Pub. Date: Aug. 29, 2019

(65) Prior Publication Data

US 2020/0403365 A1 Dec. 24, 2020

(30) Foreign Application Priority Data

Feb. 26, 2018 (DE) ..................... 10 2018 104 262.0

(51) Int. Cl.
*H01R 43/00* (2006.01)
*H01R 13/24* (2006.01)
(Continued)

(52) U.S. Cl.
CPC ....... *H01R 43/007* (2013.01); *H01R 13/2414* (2013.01); *H01R 43/16* (2013.01);
(Continued)

(58) Field of Classification Search
CPC .. H01R 43/007; H01R 43/16; H01R 13/2414; H01R 13/6476; H01R 13/035; H01R 12/714; H01R 24/50
See application file for complete search history.

(56) References Cited

U.S. PATENT DOCUMENTS 3,363,221 A * 1/1968 Frank .................. H01R 13/035 439/585
5,158,465 A 10/1992 Zaderej et al.
(Continued)

FOREIGN PATENT DOCUMENTS

CN 102217143 A 10/2011
CN 104143750 A 11/2014
(Continued)

OTHER PUBLICATIONS

Abstract of CN104143750A.

*Primary Examiner* — Jeffrey T Carley
(74) *Attorney, Agent, or Firm* — David P. Dickerson

(57) ABSTRACT

The present invention relates to a method for producing a high-frequency connector. The method includes producing a basic body part from a dielectric material by means of an additive manufacturing method. The basic body part has a bushing between a first end and a second end of a longitudinal extent of the basic body part and an end face at the first end for making contact with a mating connector. In addition, the method includes coating the dielectric basic body part with an electrically conductive layer and removing the electrically conductive layer in a region surrounding the bushing in each case at the end face at the first end and at the second end of the basic body part so as to form an electri-
(Continued)

Figure 1A:
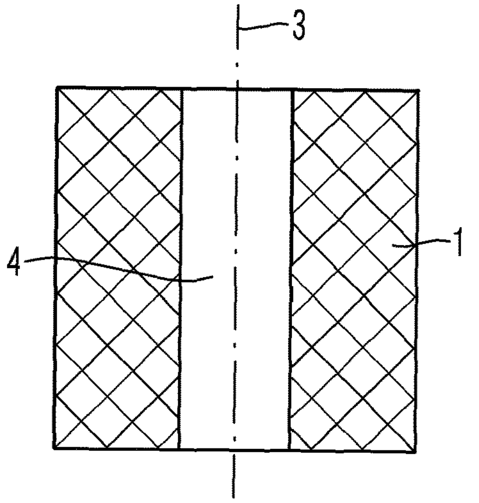

cally conductive coating on the outer conductor side and an electrically conductive coating on the inner conductor side. The present invention also relates to a high-frequency connector.

19 Claims, 16 Drawing Sheets

(51) Int. Cl.

| | |
|---|---|
| ***H01R 43/16*** | (2006.01) |
| *H01R 12/71* | (2011.01) |
| *H01R 13/03* | (2006.01) |
| *H01R 24/50* | (2011.01) |

(52) U.S. Cl.

CPC .......... *H01R 12/714* (2013.01); *H01R 13/035* (2013.01); *H01R 24/50* (2013.01)

(56) References Cited

U.S. PATENT DOCUMENTS

| | | | | |
|---|---|---|---|---|
| 5,662,480 | A * | 9/1997 | Togashi | H01R 24/50 439/582 |
| 6,296,492 | B1 * | 10/2001 | Fujimoto | H01R 13/6315 439/63 |
| 6,930,240 | B1 * | 8/2005 | Giboney | H01R 12/594 439/497 |
| 6,971,896 | B2 * | 12/2005 | Bartley | H01R 13/6477 439/215 |
| 8,137,113 | B2 | 3/2012 | Ouchi et al. | |
| 9,293,873 | B2 | 3/2016 | Rosenberger | |
| 9,882,323 | B2 * | 1/2018 | Tziviskos | H01R 13/6585 |
| 2005/0221673 | A1 * | 10/2005 | Myer | H01R 43/18 439/607.01 |
| 2009/0197437 | A1 | 8/2009 | Ouchi et al. | |
| 2011/0217870 | A1 | 9/2011 | Blakborn | |
| 2012/0024592 | A1 * | 2/2012 | Barnett | H01R 13/2407 174/520 |
| 2012/0164888 | A1 | 6/2012 | Rathburn | |
| 2015/0340825 | A1 * | 11/2015 | Ng | H01R 13/6581 29/876 |
| 2016/0005513 | A1 * | 1/2016 | Sekido | A61B 1/00124 174/74 R |
| 2018/0040978 | A1 | 2/2018 | Blakborn et al. | |
| 2019/0081444 | A1 * | 3/2019 | Dubois | H01R 9/05 |
| 2019/0239340 | A1 * | 8/2019 | Trulli | H01R 24/44 |

FOREIGN PATENT DOCUMENTS

| | | | | |
|---|---|---|---|---|
| CN | 107408780 | A | 11/2017 | |
| DE | 102011103524 | A1 | 12/2012 | |
| DE | 102012216101 | A1 | 4/2014 | |
| DE | 102015001652 | A1 | 8/2016 | |
| DE | 102015004151 | A1 | 10/2016 | |
| EP | 3772141 | A1 * | 2/2021 | H01B 11/18 |
| GB | 2371261 | A * | 7/2002 | H01R 24/50 |

* cited by examiner

METHOD FOR PRODUCING A HIGH-FREQUENCY CONNECTOR AND ASSOCIATED APPARATUS

FIELD OF THE DISCLOSURE

The present disclosure relates to a method for producing a high-frequency connector and an associated apparatus.

TECHNICAL BACKGROUND

An electrical connection between a cable and a further cable is produced and released again by means of a pair comprising a connector and an associated mating connector which can be connected to one another.

Such a connector can also be realized between a cable and a printed circuit board or between a cable and a housing of an electronic assembly. In each case one connector can also be implemented between two printed circuit boards or between a printed circuit board and a housing of a printed circuit board or between the housings of two electronic assemblies.

Such connectors realize an electrical connection not only for one or more DC-voltage signals or a low-frequency signals, but also for one or more high-frequency signals. Here and in the text which follows, a high-frequency signal is understood to mean a signal having a frequency of above 3 MHz to 30 THz, i.e. virtually the entire range of the electromagnetic spectrum.

In accordance with, for example, DE 10 2011 103 524 A1, each connector for a high-frequency signal comprises at least an inner conductor element, an outer conductor element arranged coaxially with respect thereto, and an insulator element arranged therebetween, said insulator element spacing apart the inner conductor element and the outer conductor element.

The inner conductor element, the insulator element and the outer conductor element are manufactured as separate component parts conventionally by means of cutting technology, for example turning, or by means of non-cutting forming technology, for example punching and bending. Then, the individual component parts are assembled in a comparatively complex manner to form a connector.

In order to transmit a high-frequency signal on the transmission path—cable or printed circuit board, connector, mating connector, cable or printed circuit board—the impedance of the connector and the mating connector needs to be matched to the impedance of the cable and the high-frequency signal line on the printed circuit board. If the impedance is not matched, undesired reflection of the high-frequency signal to be transmitted takes place at the individual interfaces.

The requirement of impedance matching for connectors as far as into the extra-high frequency range, in combination with increased mechanical and thermal requirements, for example resistance to vibration, resistance to wear, thermal stability, etc., and special geometric requirements, quite often represents a feasibility limit for conventional manufacturing technologies.

A further technical requirement placed on future connector generations consists in the increasing miniaturization of the connector. High-frequency connectors which transmit a multiplicity of high-frequency signals within a very tight space in different application areas require dimensions in the micrometers range and, under certain circumstances, in the nanometers range. In particular in the case of such requirements, the conventional manufacturing technology will come to its limits.

This is a circumstance which needs to be improved.

SUMMARY OF THE DISCLOSURE

The methods of the present disclosure can be used for inexpensive production of a connector for at least one high-frequency signal which is optimized in terms of its electrical and mechanical properties and can also be produced with very small dimensions and with quality.

The present disclosure teaches a method for producing a high-frequency connector, comprising:

- producing a basic body part of the high-frequency connector from a dielectric material by means of an additive manufacturing method,
- wherein the basic body part has a through-hole between a first end and a second end of a longitudinal extent of the basic body part, and
- an end face at the first end for making contact with a mating connector,
- coating the dielectric basic body part with an electrically conductive layer, and
- removing the electrically conductive layer in a region surrounding the through-hole at the end face at the first end and at the second end of the basic body part so as to form an electrically conductive coating on the outer conductor side and an electrically conductive coating on the inner conductor side.

In accordance with the present disclosure, a basic body part of the high-frequency connector, which has a through-hole between a first end and a second end of its longitudinal extent, is produced from a dielectric material by means of an additive manufacturing method. A basic body part having such a form and consisting of such a material is used for an insulator element of the high-frequency connector.

The high-frequency connector is preferably assembled from an integral basic body part. In the particular case of a multi-piece basic body part, the dielectric individual parts of the basic body part are connected to one another in a suitable manner, for example by means of adhesive bonding, prior to the coating process.

In accordance with the present disclosure, in addition the dielectric basic body part is coated with an electrically conductive layer. Finally, in accordance with the present disclosure, the electrically conductive layer is removed in a region surrounding the through-hole in each case at the end face at the first end and at the second end of the basic body part. In this way, advantageously a high-frequency connector with an inner conductor coating and an outer conductor coating is produced, with the coatings each being electrically insulated from one another by the dielectric material of the basic body part.

The substantial advantage of this production method consists in that the individual component parts of the high-frequency connector, i.e. the inner conductor element, the insulator element and the outer conductor element, no longer need to be manufactured individually and then assembled in a comparatively complex manner to form the finished high-frequency connector. Instead, the high-frequency connector is produced in three sequential manufacturing steps, which can be automated.

In addition, the production of the basic body part from a dielectric material by means of an additive manufacturing method in comparison with the manufacture of individual parts using a conventional manufacturing technology advantageously makes it possible to realize very complex and extremely small geometries. These complex and small geometries can thus additionally advantageously be combined with complex material combinations. Therefore, high-frequency connectors with complex electrical and mechanical requirements can be produced. In particular, high-frequency connectors with an impedance which can be set along its entire longitudinal extent can be produced.

A settable impedance of a high-frequency connector will be understood here and in the text which follows to mean an impedance which, between the two interfaces at the first and second ends of the basic body part, is matched to the impedance of the respective connection partner, i.e. the high-frequency mating connector, of the high-frequency cable or high-frequency signal line on a printed circuit board. A preferably constant impedance over the entire longitudinal extent is realized by suitable shaping and material selection of the basic body part. In the particular case of a different impedance of the two connection partners, a matched impedance is achieved by virtue of a continuous or at least multiply stepped transition between the two different values at the first and second ends of the basic body part being implemented by means of shaping and material section in the basic body part.

An “additive manufacturing method”, which is also referred to as a “generative manufacturing method”, will be understood here and in the text which follows to mean a manufacturing method which produces products with high precision and at low cost on the basis of computer-internal data models from a formless (liquids, gels/pastes, powders etc.) or form-neutral (strip-shaped, wire-shaped, sheet-shaped) material by means of chemical and/or physical processes. Although the method is a forming method, no special tools which have stored the respective geometry of the workpiece (for example dies) are required for a specific product.

In order to realize very small geometry structures of the high-frequency connector, 3D laser lithography is preferably suitable, particularly preferably two-photon laser lithography. With the multi-photon polymerization used here, a photosensitive material, preferably a liquid photosensitive material, particularly preferably a highly viscous photosensitive material, is preferably bombarded by means of a laser with individual laser light strikes and in the process cures at specific points. In this way, the basic body part of the high-frequency connector is constructed stepwise from the photosensitive dielectric material.

After the production of the dielectric basic body part of the high-frequency connector by means of an additive manufacturing method, the basic body part is coated with an electrically conductive layer. An electrochemical coating method, for example an electroplating process, is preferably suitable as the coating method. In this case, an electrical circuit between a cathode, which is connected to the body to be electroplated, and an anode consisting of the coating material is constructed in an electroplating bath with an electrolyte. Copper is preferably suitable as coating material. In addition, palladium, silver, gold, nickel, tin or tin-lead can also be used.

In addition to an electrochemical process, a chemical method can also be used for the coating process. In a chemical method, a starting material which has bonded to a carrier gas or dissolved in a liquid reacts, under certain reaction conditions, for example temperature and pressure, with the basic body part consisting of the dielectric material and, as a result of this reaction, produces an electrically conductive layer, preferably a metallic layer.

Finally, a physical method can also possibly be used as coating method, such as, for example, the sputtering method or other evaporation methods.

Alternatively, a combination of an electrochemical method with a chemical method or a combination of an electrochemical method with a physical method is also conceivable as an alternative coating process.

For the removal of the electrically conductive layer at a first end and at a second end of the basic body part in a region surrounding the through-hole of the basic body part, a mechanical method such as, for example, grinding of the at least one electrically conductive layer using a grinding tool designed suitably for this purpose can be used.

In addition, the removal of the electrically conductive layer can also be performed using a physical or optical method, for example by means of laser ablation or laser evaporation. In this case, the electrically conductive layer is removed from a surface of the basic body part by bombardment with laser radiation. The laser radiation used in this case has a high power density, which results in rapid heating and formation of a plasma on the surface. In this case, the chemical bonds of the electrically conductive layer, preferably the metallic layer, are broken and/or flung from the surface of the basic body part.

Finally, the electrically conductive layer can also be removed using a chemical method, for example using the so-called lift-off process. For this purpose, a sacrificial layer, preferably consisting of a photoresist, is applied between the electrically conductive layer and the basic body part consisting of dielectric material. The sacrificial layer is removed by means of a wet-chemical process using a solvent, for example acetone. The electrically conductive layer is also lifted off along with the sacrificial layer and washed away.

Advantageous configurations and developments are set forth in the further dependent claims and in the description with reference to the figures of the drawing.

It goes without saying that the features mentioned above and yet to be explained below can be used not only in the respectively specified combination, but also in other combinations or on their own without departing from the scope of the present disclosure.

In a particular development in accordance with the present disclosure, the layer thickness of the coating, i.e. the electrically conductive layer, within the through-hole is designed to be comparatively greater than the layer thickness of the electrically conductive coating on the outer lateral surface of the basic body part. In this way, high-frequency signals with a relatively high power level can also be transmitted via the high-frequency connector. In an extreme case, the coating fills the through-hole completely.

In particular when using an electrochemical coating method, i.e. when using an electroplating process, for functional reasons an electrically conductive starting layer, preferably a metallic starting layer, needs to be applied to the electrically insulating material of the basic body part by means of, for example, a chemical method prior to the application of the actual electrically conductive layer.

Therefore, the coating of the dielectric basic body part with an electrically conductive layer preferably includes coating of the dielectric basic body part with a plurality of electrically conductive layers, preferably with a plurality of metallic layers. The individual metallic layers, i.e. the starting layer and the at least one further metallic layer applied thereto, preferably consist of a different metallic material. By suitable selection of the layer sequences, particularly pronounced electrical and mechanical properties, for example minimized contact resistance or optimized abrasion resistance, can thus be realized in particular in the contact-making regions.

Instead of a through-hole between the first and second ends of the longitudinal extent of the dielectric basic body part, it is also possible for two through-holes to be formed between the first and second ends of the basic body part. In this case, a high-frequency connector for a differential high-frequency signal can be realized. Finally, a plurality of pairs of through-holes for a high-frequency connector for a plurality of differential high-frequency signals is also possible. The pairs of through-holes for transmitting a plurality of differential high-frequency signals can be arranged in the dielectric basic body part in each case in the form of a star with respect to one another or in each case parallel to one another.

In contrast to the conventional manufacturing technology, the additive manufacturing method advantageously provides the possibility of realizing very complex geometric forms in the interface region of a high-frequency connector. In this way, completely new contours for electrical contact-making in the connected state and for mechanical guidance in the connecting process between a high-frequency connector and an associated high-frequency mating connector can be realized. At the same time, a set impedance can be implemented along the longitudinal extent of the high-frequency connector.

For this purpose, contact-making regions on the outer conductor side and on the inner conductor side for electrical contact-making with contact-making regions on the outer conductor side and on the inner conductor side which belong to the associated high-frequency mating connector are formed at the first end of the basic body part of the high-frequency connector. In each case one of the two contact-making regions can additionally act as guide region in the connecting process. In the case of end-face contact-making on the outer conductor side and on the inner conductor side, neither of the two contact-making regions is used as guide region.

The contact-making regions on the outer conductor side and on the inner conductor side in addition to the guide regions with a further high-frequency mating connector, a high-frequency cable or a printed circuit board having a high-frequency line structure are formed at the second end of the basic body part of the high-frequency connector.

In a first variant of the production method, the basic body part is extended at its first end on the outer conductor side in the direction of the longitudinal axis of the high-frequency connector. The extension of the basic body part is in this case constructed in the form of a socket with the aid of the additive manufacturing method. This socket-shaped extension of the basic body part is used for contact-making on the outer conductor side and for guidance of the high-frequency connector and the associated high-frequency mating connector.

This high-frequency mating connector can preferably likewise be produced using an additive manufacturing method. Alternatively, the high-frequency mating connector can also be produced by means of a conventional manufacturing method.

A socket-shaped extension on the outer conductor side is in this case preferably understood to mean a sleeve-shaped extension for receiving a pin-shaped outer conductor of a high-frequency mating connector.

The inner diameter of the socket-shaped extension is in this case designed in such a way that, given a corresponding outer diameter of the high-frequency mating connector, a form-fitting or force-fitting connection can be produced with the outer conductor of a high-frequency mating connector and therefore a good electrical contact resistance can be produced. For contact-making on the outer conductor side with the high-frequency connector, the coating on the outer conductor side is guided on the outer lateral surface of the basic body part over the inner lateral surface of the socket-shaped extension. Thus, the inner lateral surface of the socket-shaped extension becomes the contact-making region on the outer conductor side.

The length of the socket-shaped extension of the dielectric basic body part is designed in such a way that, firstly, a sufficient electrical contact-making area for the outer conductor of the high-frequency mating connector and, secondly, a sufficient guide area for the high-frequency mating connector in the high-frequency connector are ensured. In addition, it is hereby ensured that an axial offset and an angular offset between the high-frequency connector and the associated high-frequency mating connector each lie within technically fixed tolerances or are brought under control in another way.

In a second variant of the production method, the basic body part is extended on the inner conductor side at its first end in the direction of the longitudinal axis of the high-frequency connector. The extension of the basic body part is in this case constructed to be pin-shaped with the aid of the additive manufacturing method. The pin-shaped extension on the inner conductor side of the basic body part is used firstly for electrical contact-making on the inner conductor side between the high-frequency connector and an associated high-frequency mating connector. In addition, the pin-shaped extension on the inner conductor side of the basic body part is used for guidance of the high-frequency connector in a preferably socket-shaped inner conductor of the high-frequency mating connector.

As regards the design of the outer diameter and the length of the pin-shaped extension on the inner conductor side of the basic body part in the second variant of the production method, correspondingly that which has been mentioned above in relation to the design of the inner diameter and the length of the socket-shaped extension on the outer conductor side of the basic body part applies.

A through-hole, preferably at least one through-hole, is formed with the aid of the additive manufacturing method in the pin-shaped extension of the basic body part, preferably in the direction of the longitudinal axis of the high-frequency connector. This ensures that the metallic layer on the outer surface of the pin-shaped extension on the inner conductor side is connected contiguously, without any interruption, to the metallic layer on the inner conductor side in the through-hole of the basic body part.

In a preferred embodiment of the second variant of the production method, a pin-shaped extension on the inner conductor side of the basic body part is constructed with a star-shaped structure.

A formation of a star-shaped structure of the pin-shaped extension of the basic body part will in this case be understood to mean the construction of a plurality of substantially identically formed regions which, starting from the region on the inner conductor side of the basic body part, each run at a certain angle with respect to one another and adjacent to one another as far as the longitudinal axis of the high-frequency connector.

The pin-shaped extension of the basic body part having a star-shaped structure advantageously provides multiple contact-making between the pin-shaped extension on the inner conductor side of the basic body part belonging to the high-frequency connector and the associated socket-shaped inner conductor of the high-frequency mating connector.

In a first subvariant of the second variant of the production method, the pin-shaped extension on the inner conductor side of the basic body part is constructed from a number n of lamella-shaped regions consisting of dielectric material. In this case, in each case two adjacent lamella-shaped regions enclose an angle of 360°/n. These lamella-shaped regions are constructed in such a way that they are firstly connected to one another in the region of the longitudinal axis of the high-frequency connector and are secondly each connected to the rest of the basic body part in the region on the inner conductor side of the basic body part. Therefore, in each case one axial through-hole in the pin-shaped extension of the basic body part is formed between two adjacent lamella-shaped regions.

In order to improve radial contact-making with the high-frequency mating connector, in particular in order to realize preferably hemispherical radial contact-making, in each case one contact ridge is constructed on an end face of each lamella-shaped region with the aid of the additive manufacturing method. This contact ridge has a form with a cross section which reduces in size in the direction of the contact-making point or the contact-making area. It can assume, for example, the form of a hemisphere, half of an ellipsoid, an apex of a cone or an apex of a pyramid.

In order to exert sufficient contact pressure of the pin-shaped extension on the inner conductor side of the basic body part belonging to the high-frequency connector on the socket-shaped inner conductor of the high-frequency mating connector, each lamella-shaped region of the slot-shaped extension is designed to be elastic. For this purpose, in each case one through-bore is formed in each lamella-shaped region. The cross section of the through-bore can assume any technically expedient form, for example circular, square, rectangular, polygonal, elliptical, oval, “banana-shaped”, etc.

Alternatively, the individual lamella-shaped regions of the pin-shaped extension on the inner conductor side can also be constructed from an elastic dielectric material, to impart elasticity.

The side faces of each individual lamella-shaped region of the pin-shaped extension of the basic body part can be formed in such a way that they have a radial cross-sectional contour of a pin. Preferably, in addition to a conical form, a concavely curved form can also be used.

As an alternative to the construction of a contact ridge on the end face for realizing radial contact-making, in a second subvariant of the second variant of the production method, a high-frequency connector is produced in which in each case one contact ridge for realizing lateral contact-making is constructed on the two side faces of each lamella-shaped region of the pin-shaped extension of the basic body part. The form of the contact ridge for lateral contact-making corresponds to the contact ridge for radial contact-making.

In this case, the contact ridges on the two side faces of each lamella-shaped region of the pin-shaped extension make contact with the side faces of respectively adjacent and elastic projections, which protrude into the cavity of a socket-shaped inner conductor of the high-frequency mating connector. The production method of a high-frequency connector having such projections on the inner conductor side will be explained in more detail further below.

In a third subvariant of the second variant of the production method, a pin-shaped extension of the basic body part is likewise produced with a star-shaped structure. The pin-shaped extension on the inner conductor side of the basic body part is in this case constructed from a number n of rib-shaped regions. In this case, in each case two adjacent rib-shaped regions enclose an angle of 360°/n. These rib-shaped regions are constructed in such a way that they are firstly connected to one another in the region of the longitudinal axis of the high-frequency connector and are secondly connected to the rest of the basic body part in each case in the region on the inner conductor side of the basic body part. Therefore, in each case one axial through-hole in the pin-shaped extension of the basic body part is likewise formed between two adjacent rib-shaped regions.

With a view to improved radial contact-making, preferably hemispherical radial contact-making, in each case one contact ridge is constructed on the end faces of the individual rib-shaped regions of the pin-shaped extension of the basic body part.

In order to increase the contact pressure of the individual rib-shaped regions of the pin-shaped extension on the inner conductor side on the socket-shaped inner conductor of the high-frequency mating connector, elasticity is produced in each case by formation of a through-bore, in particular by formation of at least one through-bore, in each rib-shaped region. In comparison with the lamella-shaped regions, the rib-shaped regions have a greater elasticity given otherwise identical dimensions.

In a fourth subvariant of the second variant of the production method, the pin-shaped extension on the inner conductor side of the basic body part is constructed from a number n of regions in the form of spring arms consisting of a dielectric material. In this case, two mutually adjacent regions in the form of spring arms each enclose an angle of 360°/n. The individual spring arms are each constructed in such a way that they are connected to the region on the inner conductor side of the basic body part, in each case spaced apart from one another by an angle of 360°/n.

In order to improve radial contact-making with the high-frequency mating connector, in each case one contact ridge is constructed on an outer surface, which is directed radially outwards, of each region in the form of a spring arm with the aid of the additive manufacturing method.

Owing to its formation in the form of a spring arm, each region in the form of a spring arm of the pin-shaped extension of the basic body part has in each case an elasticity which exerts sufficient contact pressure on the socket-shaped inner conductor with which contact is to be made of the high-frequency mating connector.

The number of regions in the form of spring arms and the length of the regions in the form of spring arms in the direction of the longitudinal axis of the high-frequency connector should be configured in such a way that, firstly, sufficient electrical contact-making with the high-frequency mating connector and reliable guidance of the high-frequency connector in the socket-shaped inner conductor of the high-frequency mating connector are ensured.

In a third variant of the production method, a sleeve-shaped extension is constructed at the first end of the basic body part on the inner conductor side. This sleeve-shaped extension is formed with a plurality of slots at its distal end in order to form a plurality of spring lugs which are spaced apart from one another in each case by a slot. Contact ridges running radially outwards in each case are constructed at the distal ends of the individual spring lugs by means of the additive manufacturing method.

The sleeve-shaped extension formed from individual spring lugs makes contact, by means of the associated contact ridges running radially outwards, with the socket-shaped inner conductor of the high-frequency mating connector. The individual spring lugs are in this case formed by means of the additive manufacturing method in such a way that the sleeve-shaped extension has sufficient elasticity, with which it exerts, in the connected state, sufficient contact pressure on the inner conductor of the high-frequency mating connector. The high-frequency connector is guided safely in the socket-shaped inner conductor of the high-frequency mating connector over a sufficient longitudinal extent of the sleeve-shaped extension of the basic body part.

The metallic coating is in this case preferably guided from the inner lateral surface of the basic body part over the entire sleeve-shaped extension on the inner conductor side of the basic body part.

Preferably, contact is made between the sleeve-shaped extension of the basic body part belonging to the high-frequency connector and a step formed on the inner conductor side at the contact-making end of the high-frequency mating connector.

In a fourth variant of the production method, no extension of the basic body part is constructed at the first end of the basic body part. The first end of the basic body part therefore forms a continuous end face. This end face at the first end of the basic body part is coated with a metallic layer in each case on the inner conductor side and/or on the outer conductor side, preferably on the inner conductor side and on the outer conductor side, in such a way that a contact region on the inner conductor side and on the outer conductor side is formed for end-face contact-making on the inner conductor side and on the outer conductor side with an associated contact region on the inner conductor side and on the outer conductor side, respectively, of a high-frequency mating connector.

In order to prevent an angular offset between the high-frequency connector and the high-frequency mating connector, in each case one extension is constructed at the first end of the basic body part on the inner conductor side and/or on the outer conductor side. A cavity is formed within this extension of the basic body part. In this way, in each case elasticity acting in the direction of the longitudinal axis is realized on the inner conductor side and/or on the outer conductor side, said elasticity compensating for an angular offset between the end faces of the high-frequency connector and the associated high-frequency mating connector in the connected state.

The extension of the basic body part and the associated cavity in the extension of the basic body part can each be formed to be ring-shaped or sleeve-shaped, for example. Alternatively, a realization comprising a plurality of, for example, hemispherical extensions of the basic body part which are constructed in each case on a circle, ellipse or rectangle about the longitudinal axis of the high-frequency connector on the inner conductor side or on the outer conductor side is also conceivable. In each case associated locally limited cavities are formed within these, for example, hemispherical extensions of the basic body part.

In order to prevent an axial offset between the high-frequency connector and the high-frequency mating connector in the connected state, firstly an electrically insulating sleeve can be pressed onto the high-frequency connector, said sleeve protruding beyond the first end of the basic body. The inner diameter of this sleeve is in this case configured in such a way that the high-frequency mating connector is guided within the sleeve preferably without any axial play in the case of a given outer diameter of the outer conductor of said high-frequency mating connector. Another variant for preventing an axial offset can also be a socket-shaped extension of the basic body in the sense of the first variant of the method.

In a preferred development of the fourth variant of the production method, a contact ridge running radially outwards, preferably a ring-shaped contact ridge, is constructed on the basic body part on the outer conductor side and adjacent to the first end of the basic body part.

Using a high-frequency connector produced in this way, advantageously the contact-making on the outer conductor side with a high-frequency mating connector can be optimized with a view to locally limited and radially directed contact-making. The associated high-frequency mating connector is a high-frequency connector which has a socket-shaped extension on the outer conductor side of the basic body part, said extension being produced in accordance with the first variant of the production method.

Preferably, a region of the basic body part which is adjacent to the contact ridge running radially outwards is designed to be elastic with the aid of the additive manufacturing method. Owing to this additional elasticity, sufficient contact pressure is advantageously exerted on the outer conductor of the high-frequency mating connector by the contact ridge running radially outwards in order to realize a low electrical contact resistance.

This region of the basic body part which is to be designed to be elastic can in this case be constructed from an elastic dielectric material by means of the additive manufacturing method. Alternatively, at least one cavity can also be formed in the region of the basic body part which is to be designed to be elastic by means of the additive manufacturing method.

In a further preferred development of the first variant of the production method, a plurality of projections protruding into the through-hole of the basic body part are constructed on the basic body part on the inner conductor side adjacent to the first end of the basic body part by means of an additive manufacturing method. These projections are formed in each case on the inner lateral surface of the basic body part as locally limited widenings of the basic body part. In each case two adjacent projections are constructed on the inner lateral surface of the basic body part with such an angular spacing with respect to one another that guidance on the inner conductor side and at the same time lateral contact-making on the inner conductor side of a membrane-shaped region of a pin-shaped extension of the basic body part of the high-frequency mating connector are possible between said projections. The associated high-frequency mating connector is a high-frequency connector which is produced in accordance with the second subvariant of the second variant of the production method.

In order to implement sufficient contact pressure between the individual projections and the individual lamella-shaped regions, the individual projections are each designed to be elastic. For this purpose, they are constructed either from an elastic dielectric material and/or by corresponding elastic shaping.

A high-frequency connector produced in accordance with the production method of the present disclosure, in its form as illustrated above in terms of its individual technical embodiments and technical facets, also falls within the scope of the present invention.

Where expedient, the above configurations and developments can be combined with one another and arranged next to one another as desired. Further possible configurations, developments and implementations of the teachings of the present disclosure also include combinations of features described above or below with respect to the exemplary embodiments, even if such combination is not explicitly mentioned. In particular, in this case a person skilled in the art will also add individual aspects as improvements or additions to the respective basic form taught by the present disclosure.

LIST OF CONTENTS OF THE DRAWING

Figure 1B:
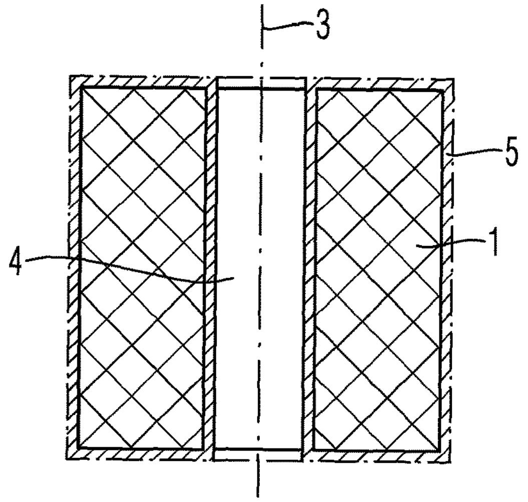
Figure 1C:
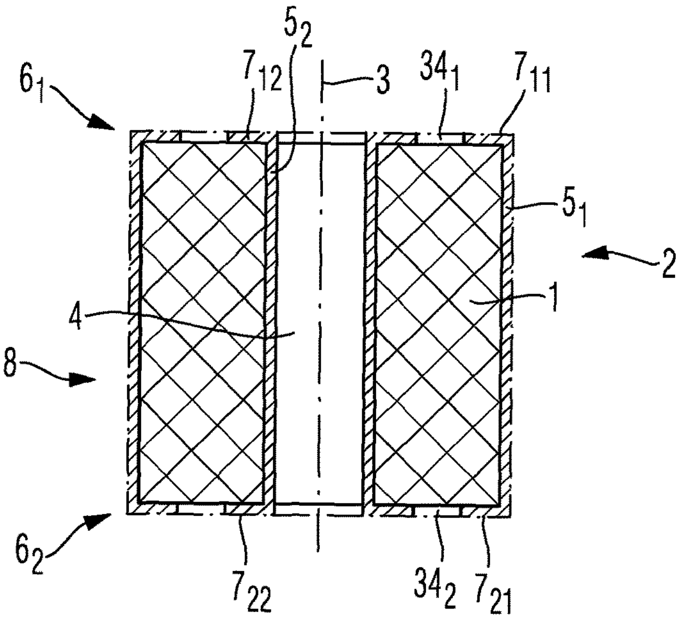
Figure 2A:
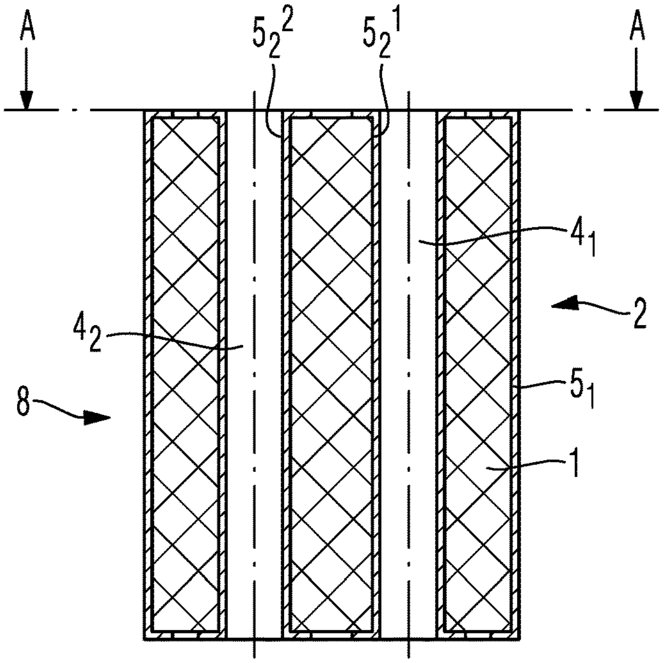
Figure 2B:
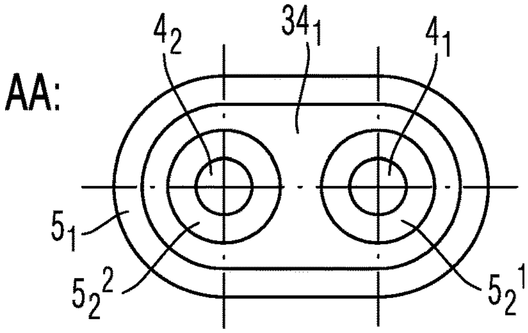
Figure 3:
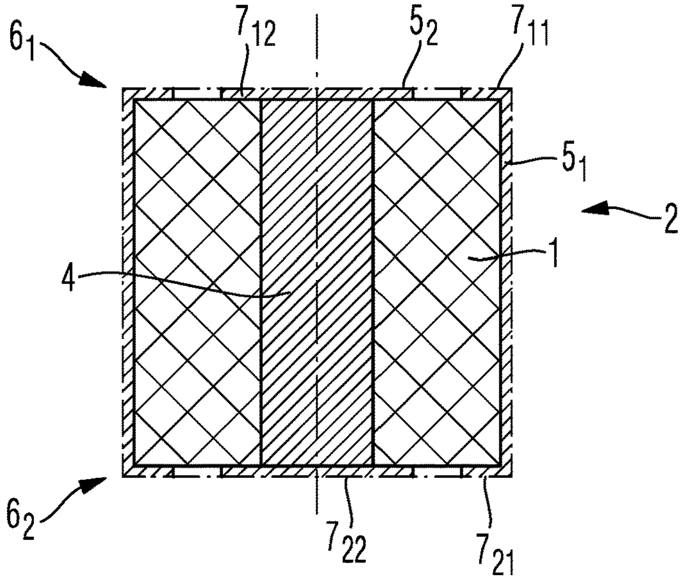
Figure 4A:
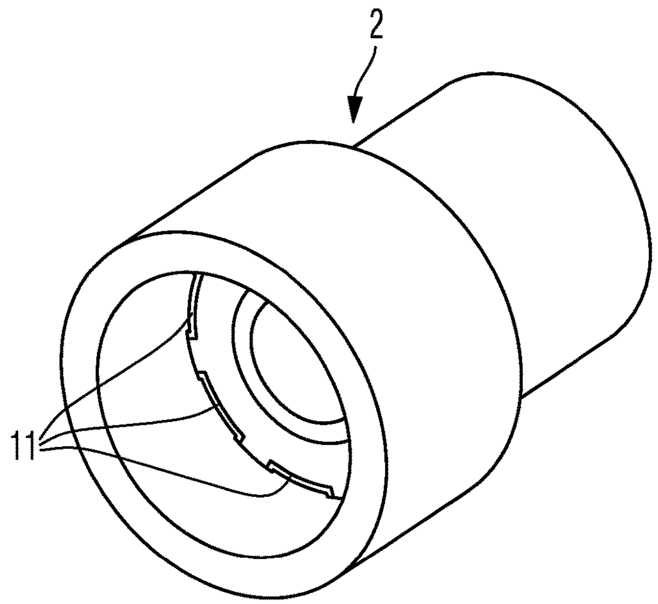
Figure 4B:
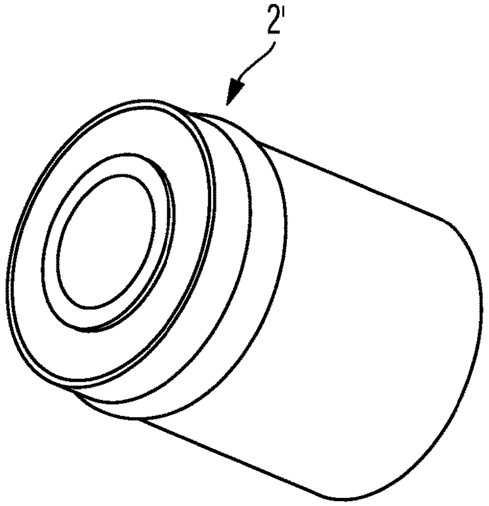
Figure 4C:
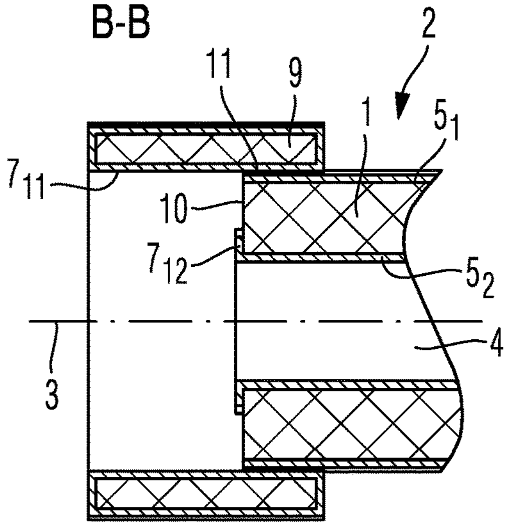
Figure 4D:
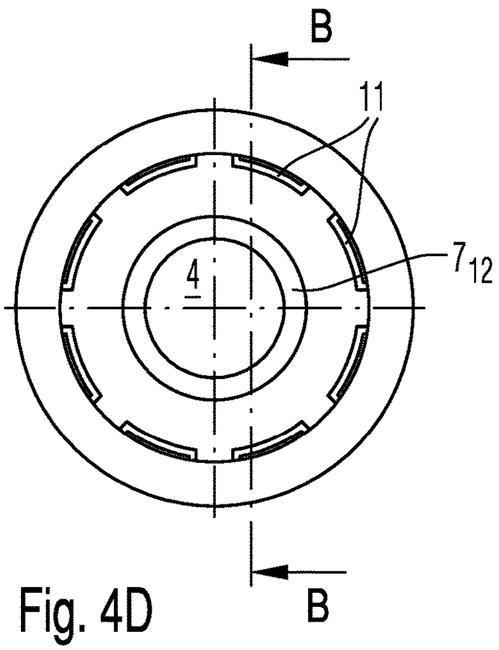
Figure 4E:
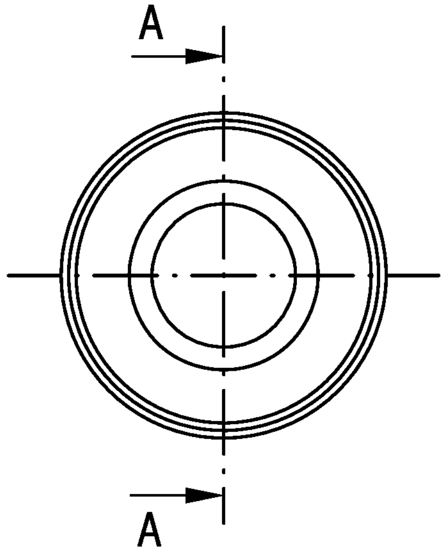
Figure 4F:
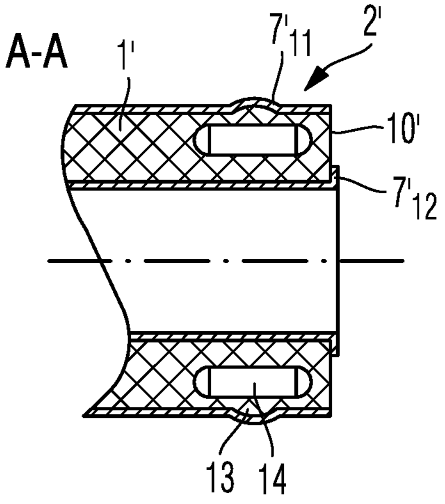
Figure 4G:
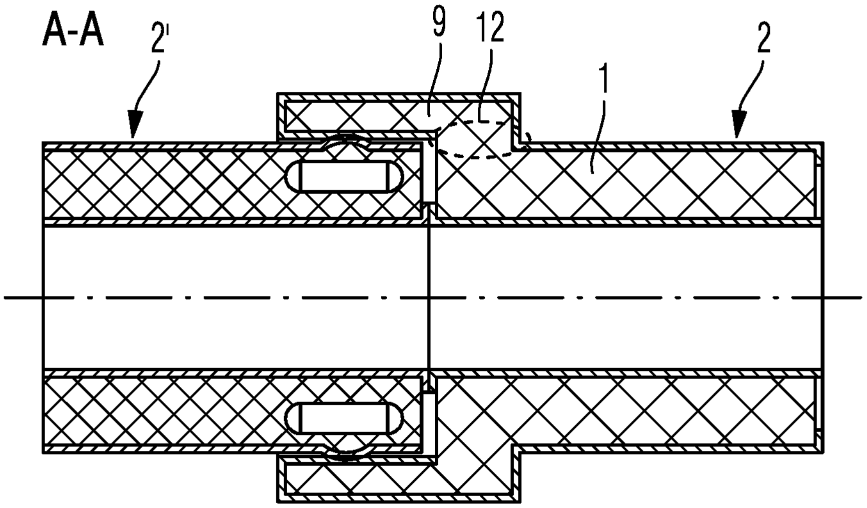
Figure 5A:
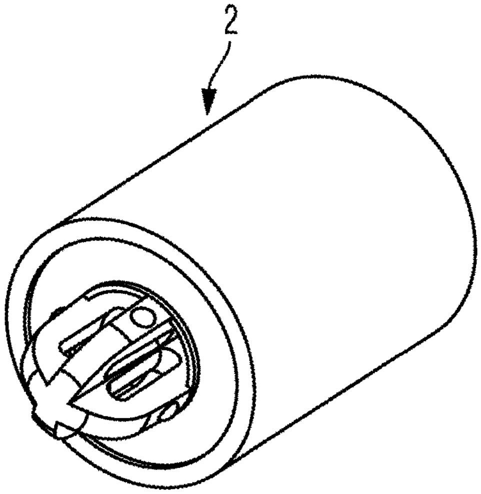
Figure 5B:
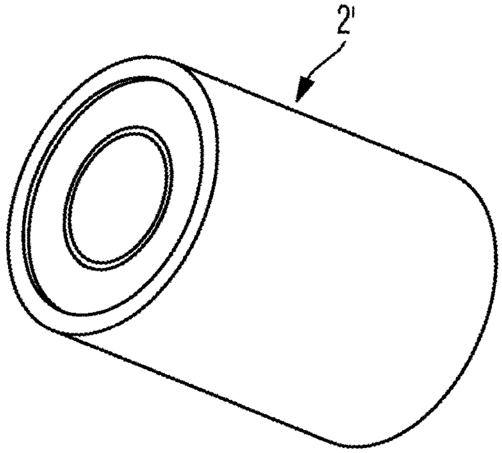
Figure 5C:
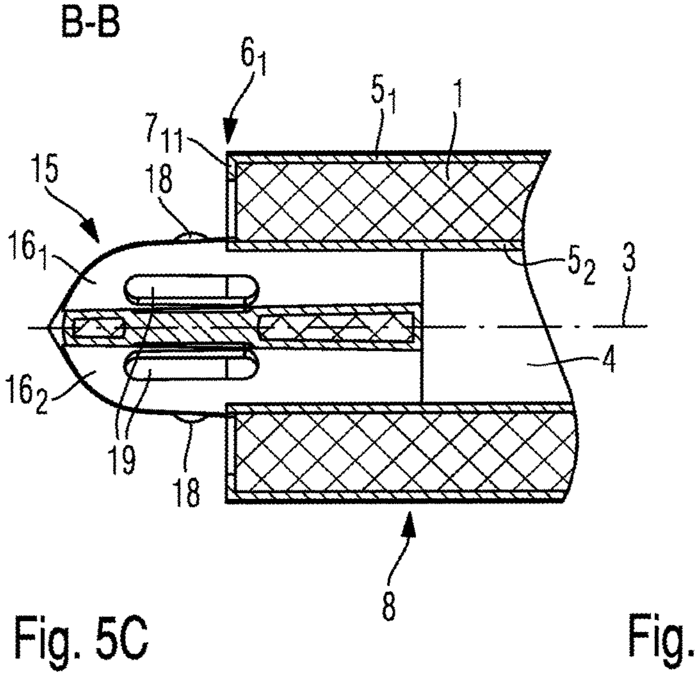
Figure 5D:
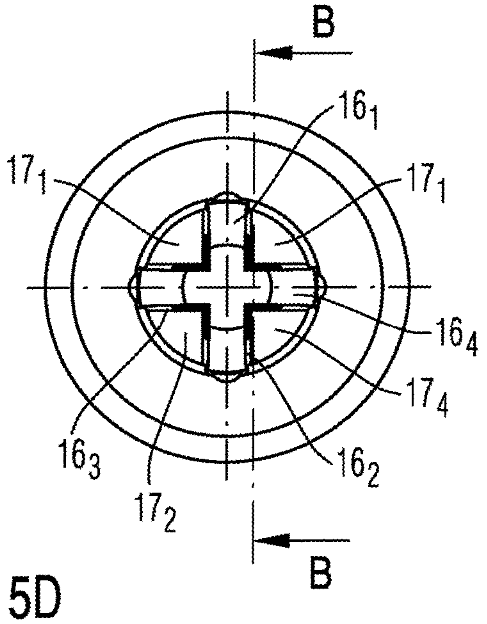
Figure 5E:
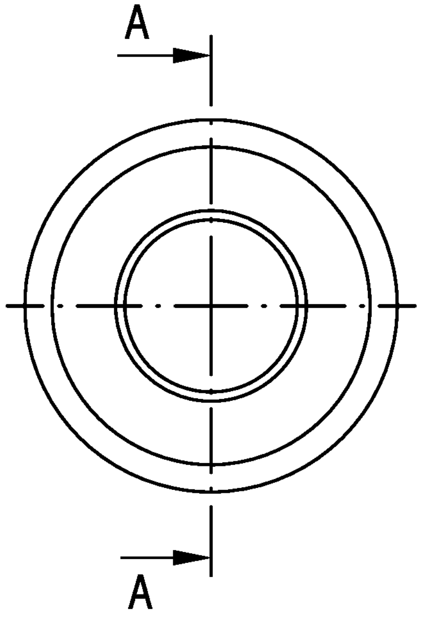
Figure 5F:
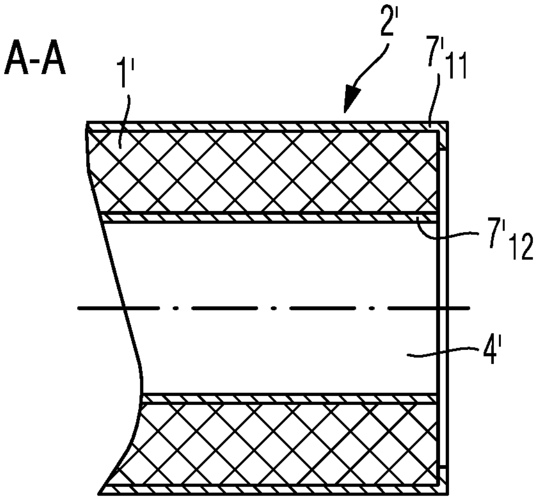
Figure 5G:
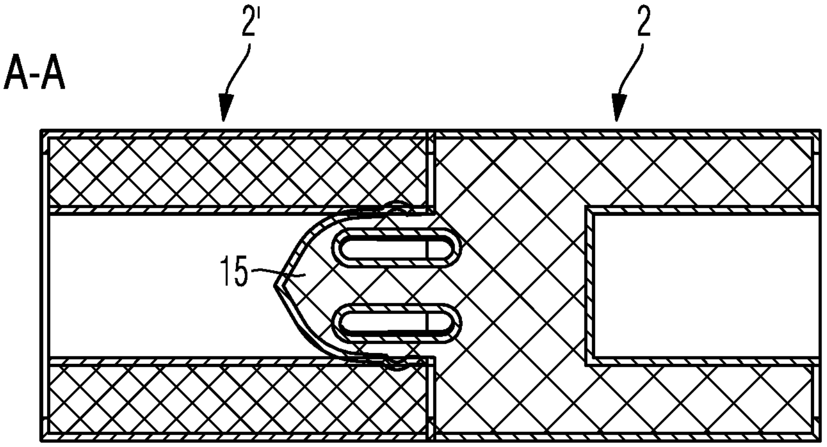
Figure 6A:
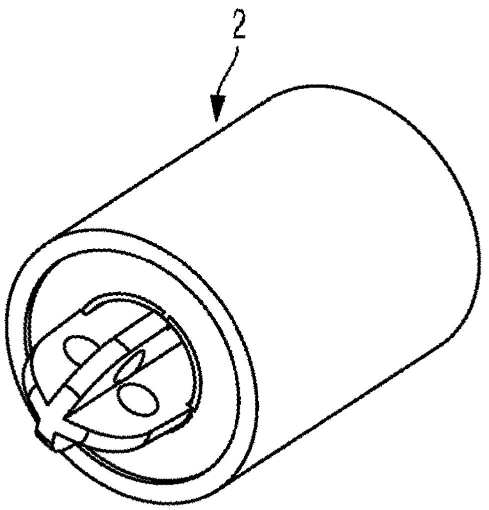
Figure 6B:
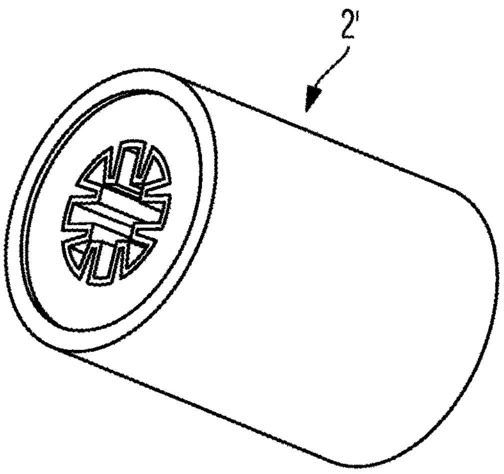
Figure 6C:
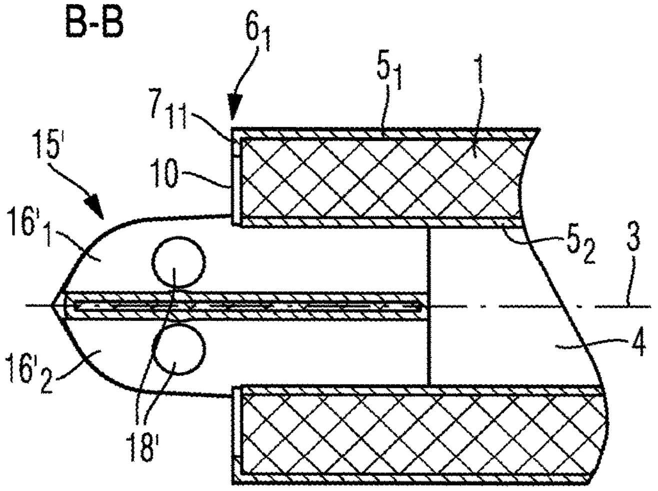
Figure 6D:
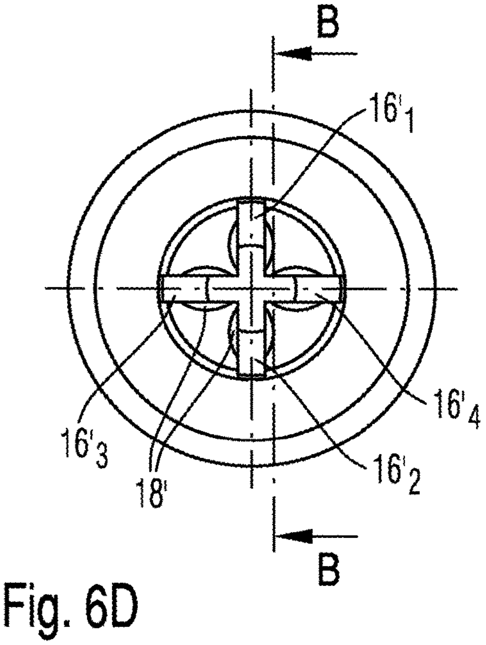
Figure 6E:
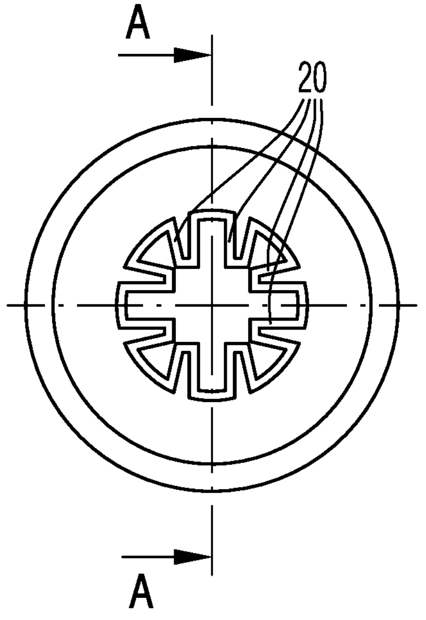
Figure 6F:
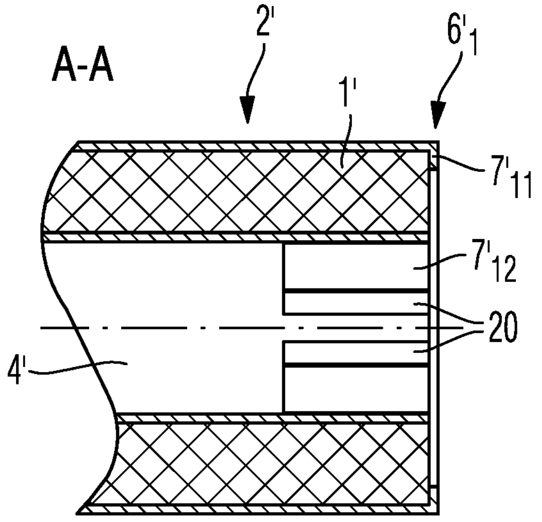
Figure 6G:
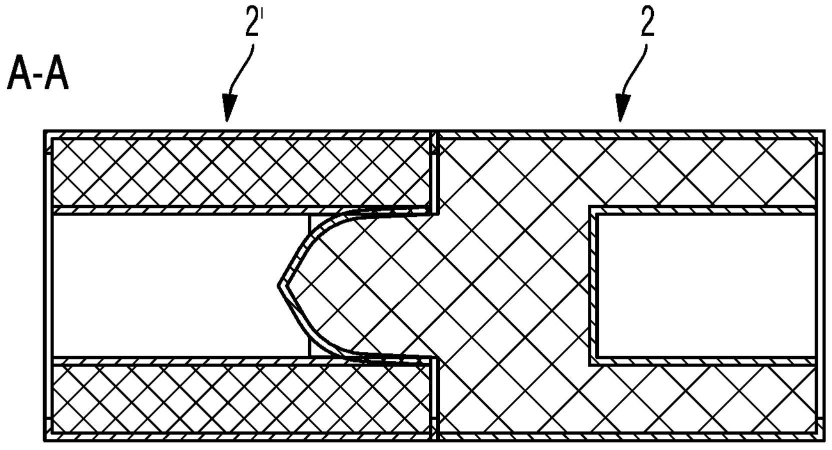
Figure 7A:
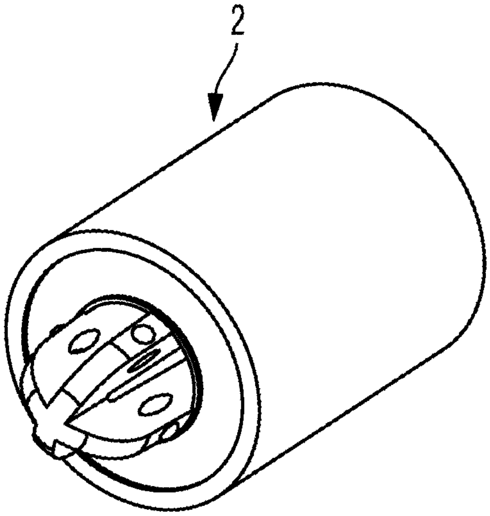
Figure 7B:
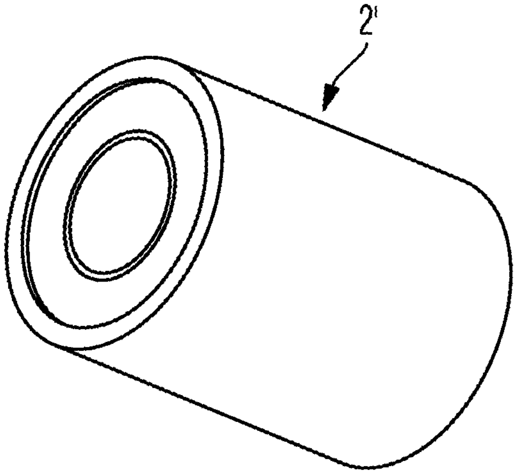
Figure 7C:
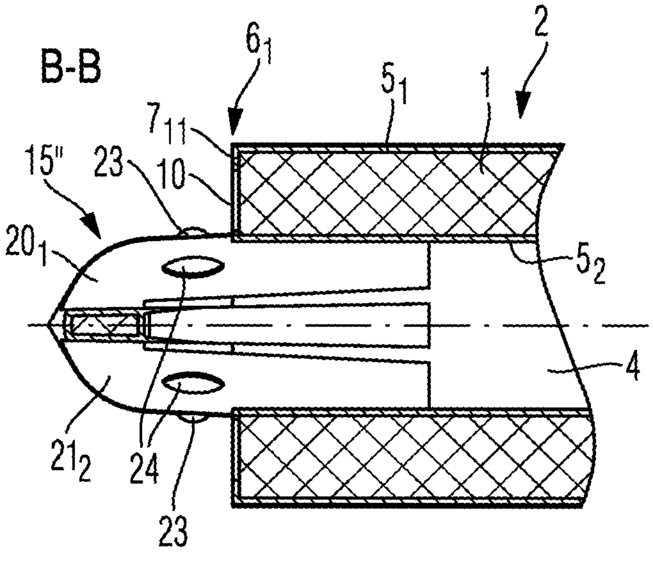
Figure 7D:
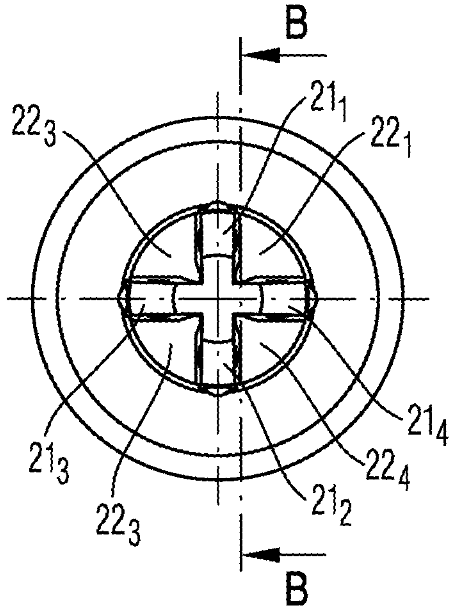
Figure 7E:
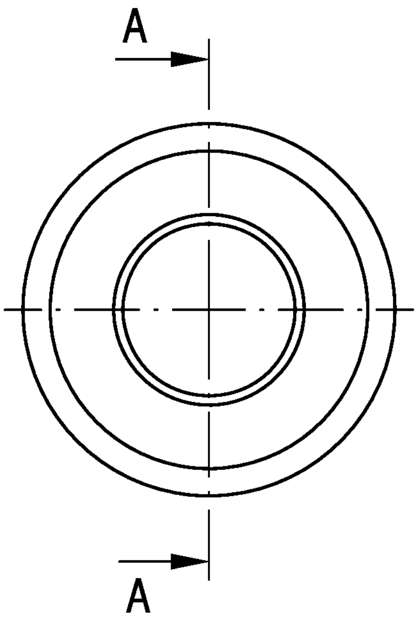
Figure 7F:
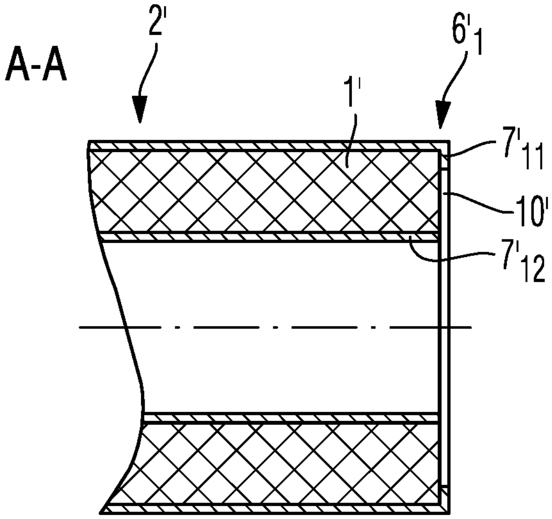
Figure 7G:
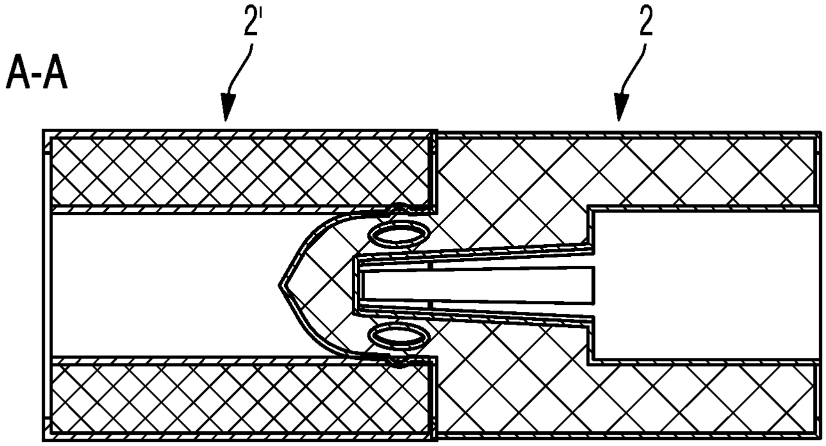
Figure 8A:
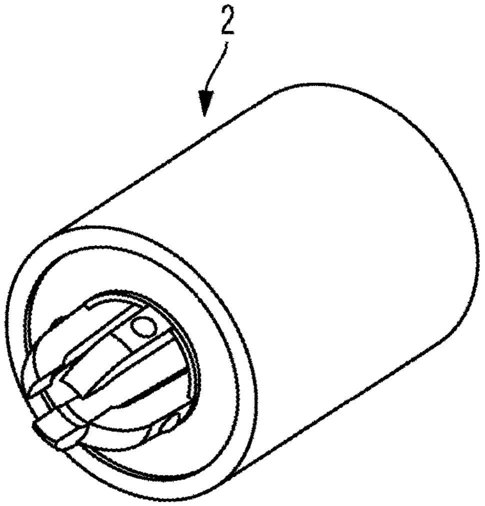
Figure 8B:
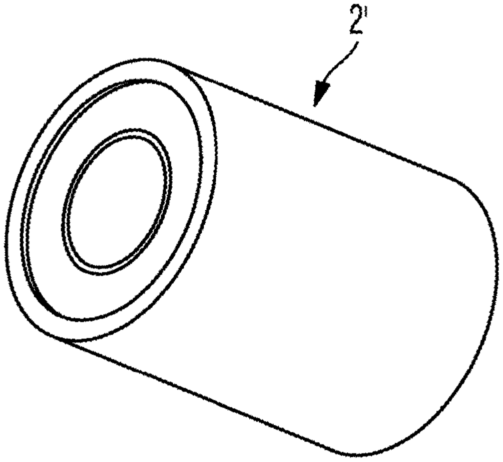
Figure 8C:
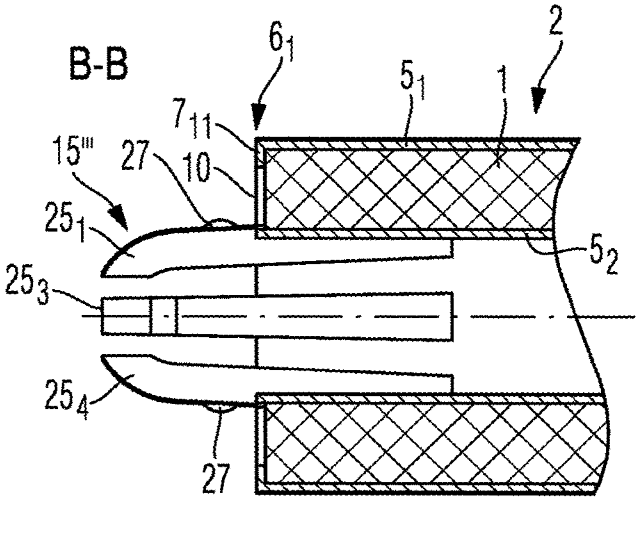
Figure 8D:
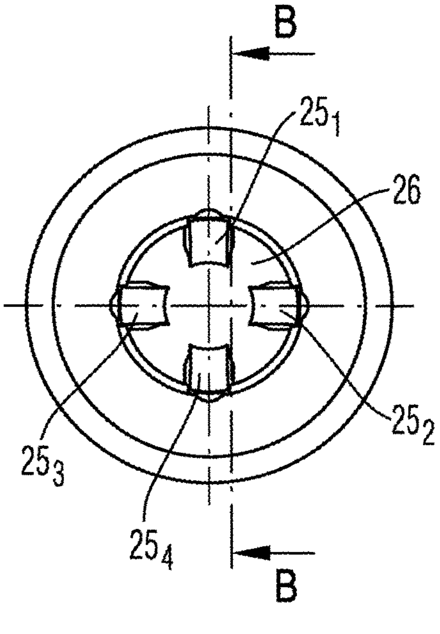
Figure 8E:
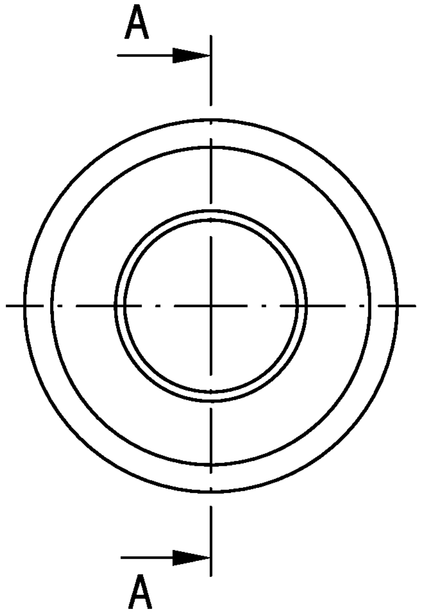
Figure 8F:
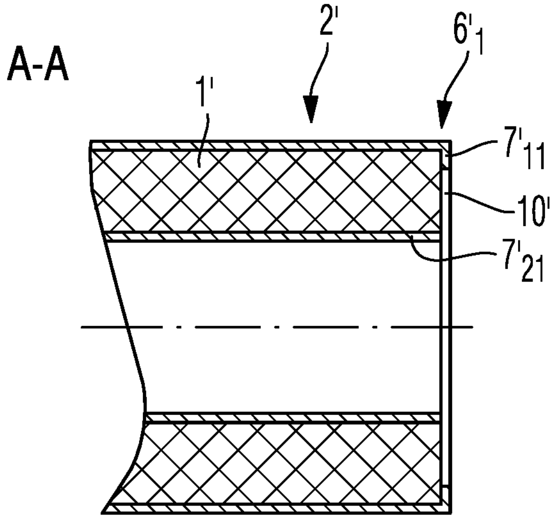
Figure 8G:
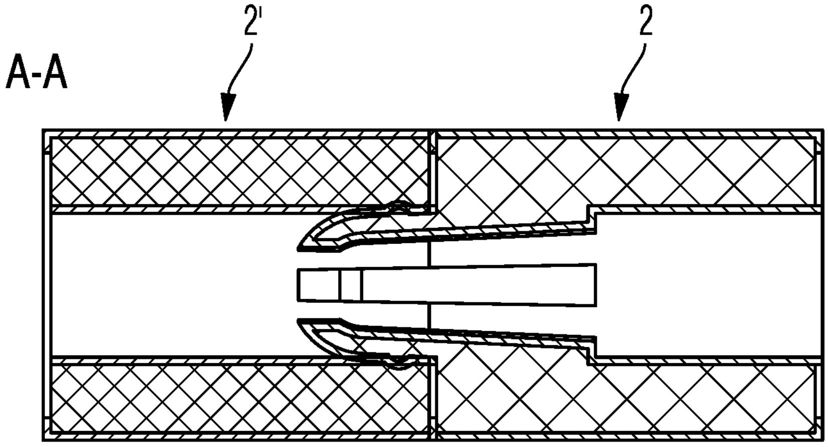
Figure 9A:
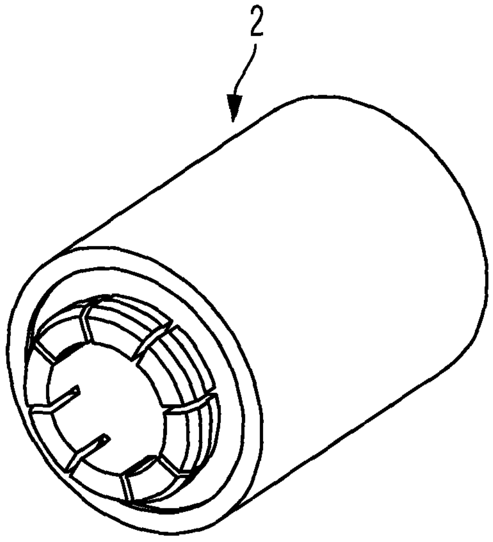
Figure 9B:
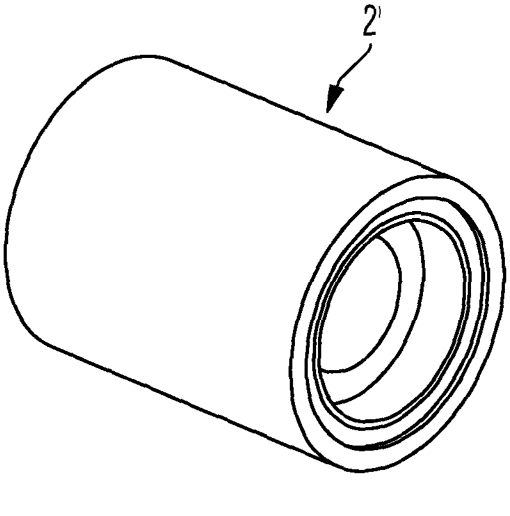
Figure 9C:
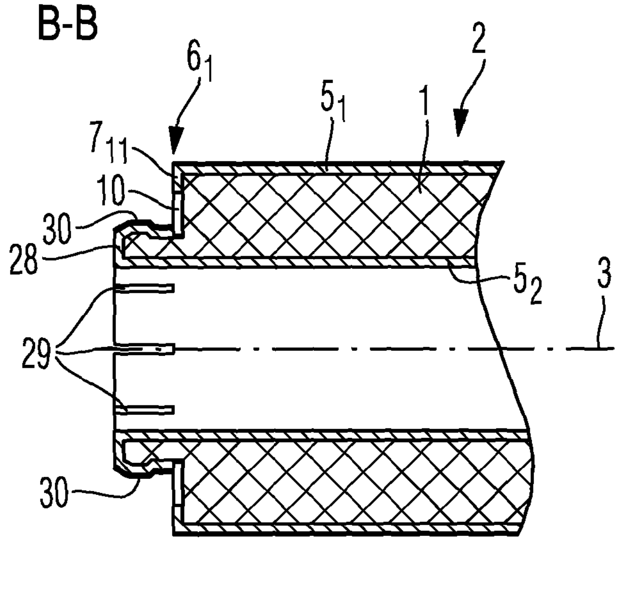
Figure 9D:
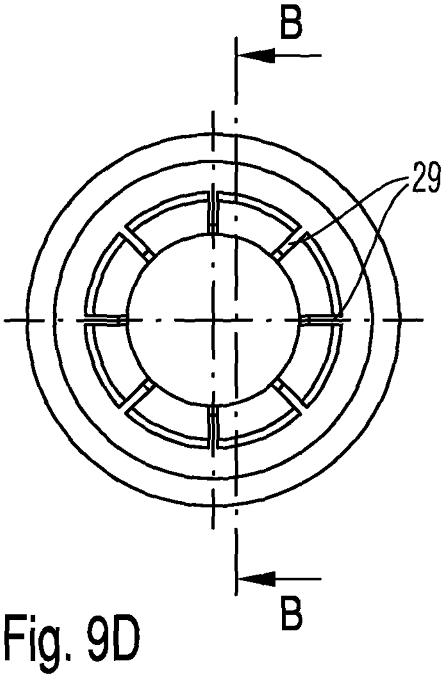
Figure 9E:
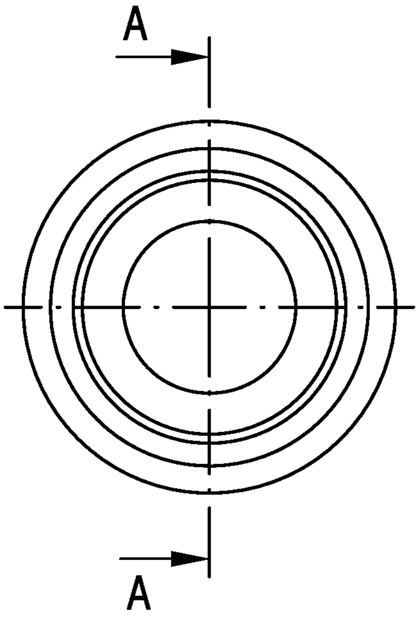
Figure 9F:
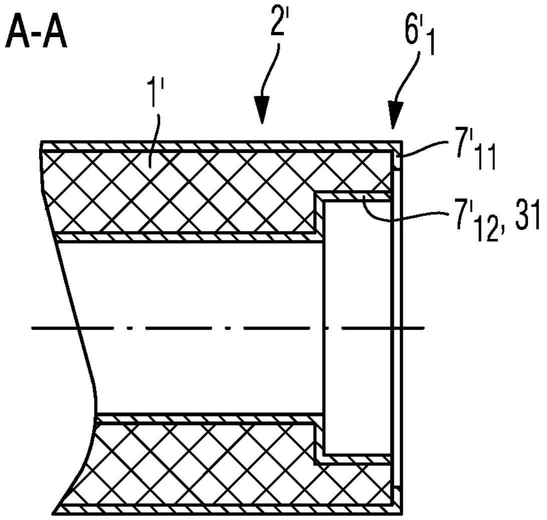
Figure 9G:
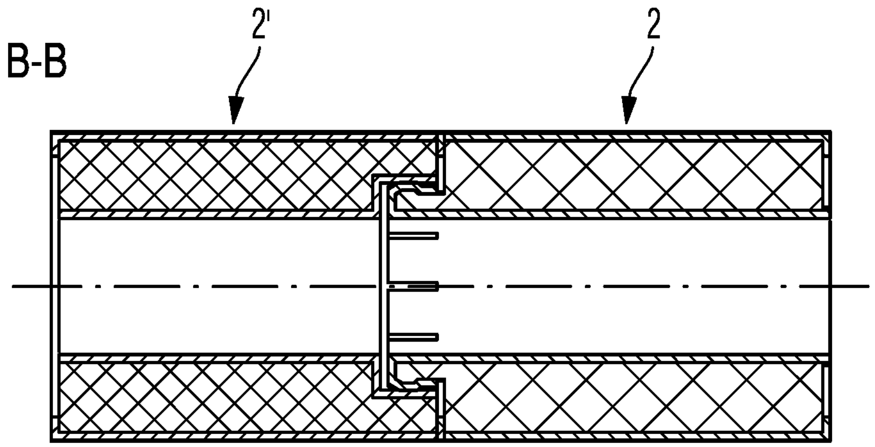
Figure 10A:
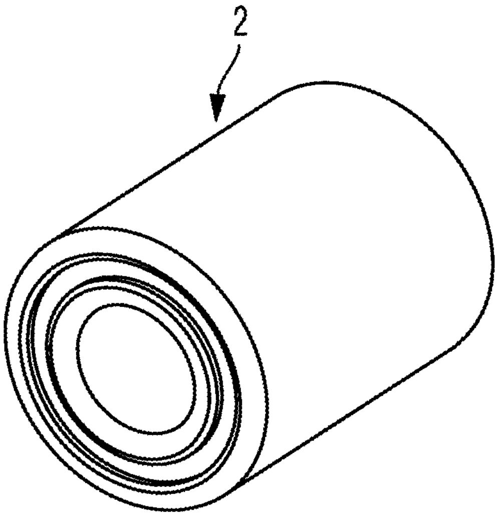
Figure 10B:
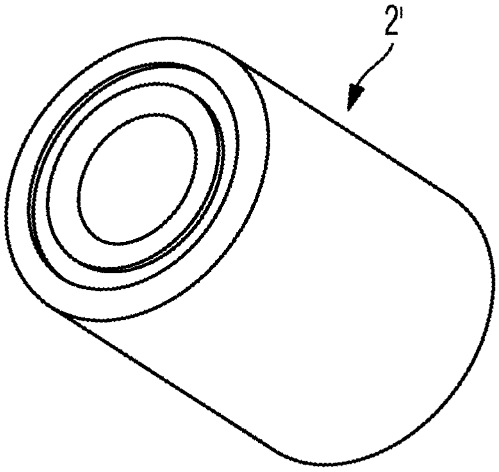
Figure 10C:
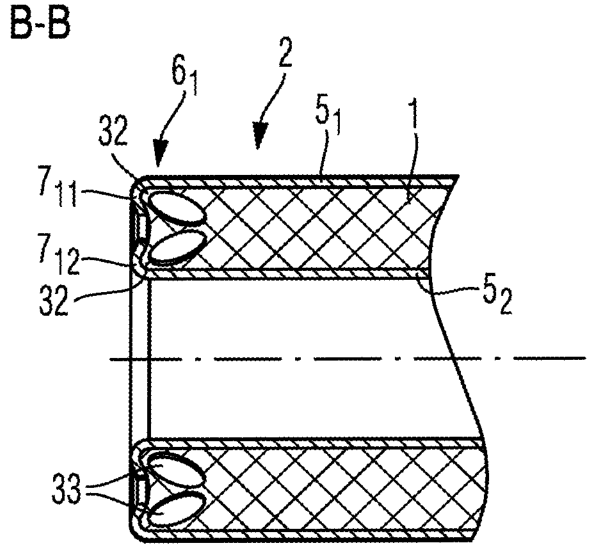
Figure 10D:
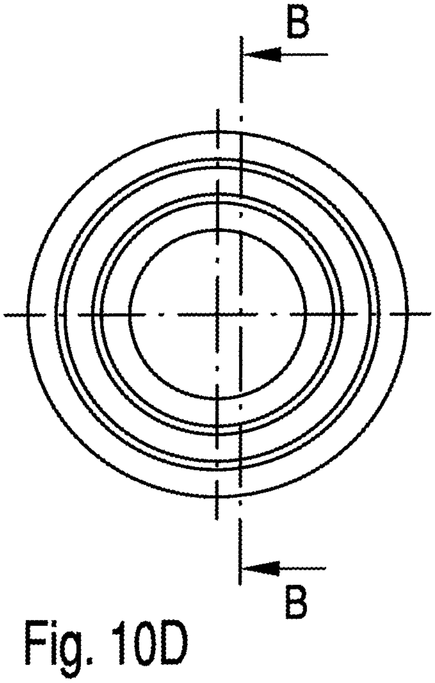
Figure 10E:
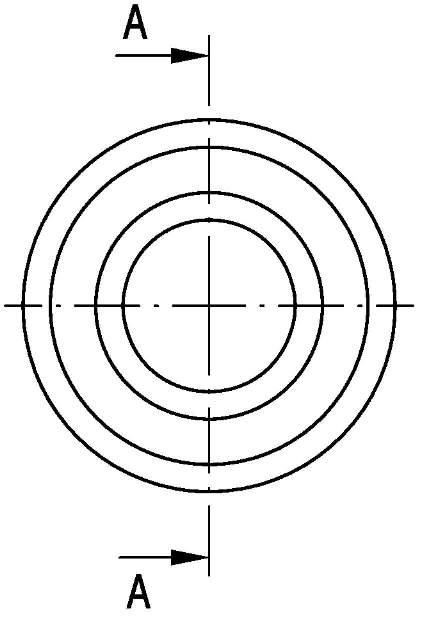
Figure 10F:
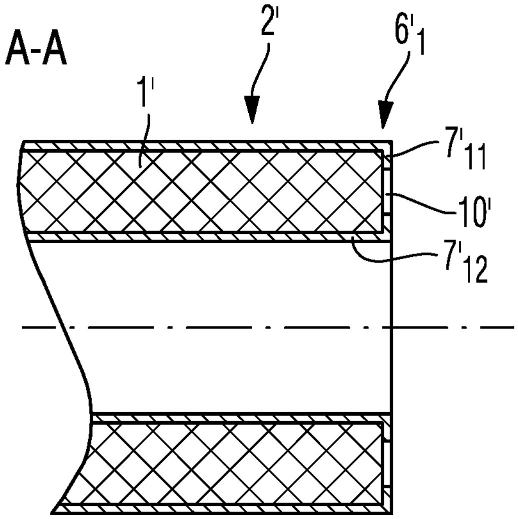
Figure 10G:
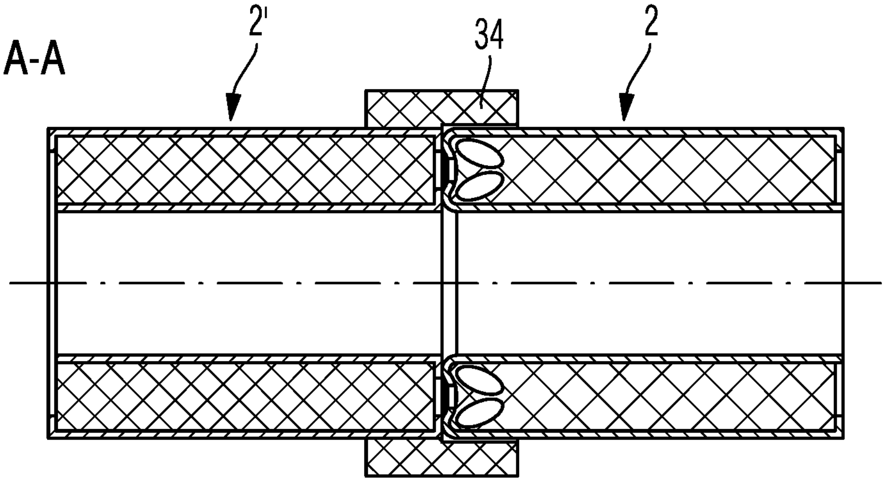

The present invention will be explained in more detail below with reference to the exemplary embodiments specified in the schematic figures of the drawing, in which:

FIG. 1A,1B,1C show a cross-sectional illustration of a basic structure of the high-frequency connector in accordance with the present disclosure in the individual manufacturing steps of the method in accordance with the present disclosure, FIG. 2A,2B show a vertical and a horizontal cross-sectional illustration of a basic structure of the high-frequency connector in accordance with the present disclosure for a differential high-frequency signal, FIG. 3 shows a cross-sectional illustration of a basic structure of the high-frequency connector in accordance with the present disclosure with complete filling of the through-hole with coating material, FIG. 4A, 4B show an isometric illustration of a high-frequency connector produced in accordance with the first variant of the method in accordance with the present disclosure and of an associated high-frequency mating connector, FIG. 4C, 4D show two cross-sectional illustrations of a high-frequency connector produced in accordance with the first variant of the method in accordance with the present disclosure, FIG. 4E, 4F show two cross-sectional illustrations of the associated high-frequency mating connector, FIG. 4G shows a cross-sectional illustration of a high-frequency connector produced in accordance with the first variant of the method in accordance with the present disclosure in the connected state with the associated high-frequency mating connector, FIG. 5A, 5B show an isometric illustration of a high-frequency connector produced in accordance with the first subvariant of the second variant of the method in accordance with the present disclosure and of an associated high-frequency mating connector, FIG. 5C, 5D show two cross-sectional illustrations of a high-frequency connector produced in accordance with the first subvariant of the second variant of the method in accordance with the present disclosure, FIG. 5E, 5F show two cross-sectional illustrations of the associated high-frequency mating connector, FIG. 5G shows a cross-sectional illustration of a high-frequency connector produced in accordance with the first subvariant of the second variant of the method in accordance with the present disclosure in the connected state with the associated high-frequency mating connector, FIG. 6A, 6B show an isometric illustration of a high-frequency connector produced in accordance with the second subvariant of the second variant of the method in accordance with the present disclosure and of an associated high-frequency mating connector, FIG. 6C, 6D show two cross-sectional illustrations of a high-frequency connector produced in accordance with the second subvariant of the second variant of the method in accordance with the present disclosure, FIG. 6E, 6F show two cross-sectional illustrations of the associated high-frequency mating connector, FIG. 6G shows a cross-sectional illustration of a high-frequency connector produced in accordance with the second subvariant of the second variant of the method in accordance with the present disclosure in the connected state with the associated high-frequency mating connector, FIG. 7A, 7B show an isometric illustration of a high-frequency connector produced in accordance with the third subvariant of the second variant of the method in accordance with the present disclosure and of an associated high-frequency mating connector, FIG. 7C, 7D show two cross-sectional illustrations of a high-frequency connector produced in accordance with the third subvariant of the second variant of the method in accordance with the present disclosure, FIG. 7E, 7F show two cross-sectional illustrations of the associated high-frequency mating connector, FIG. 7G shows a cross-sectional illustration of a high-frequency connector produced in accordance with the third subvariant of the second variant of the method in accordance with the present disclosure in the connected state with the associated high-frequency mating connector, FIG. 8A, 9B show an isometric illustration of a high-frequency connector produced in accordance with the fourth subvariant of the second variant of the method in accordance with the present disclosure and of an associated high-frequency mating connector, FIG. 8C, 8D show two cross-sectional illustrations of a high-frequency connector produced in accordance with the fourth subvariant of the second variant of the method in accordance with the present disclosure, FIG. 8E, 8F show two cross-sectional illustrations of the associated high-frequency mating connector, FIG. 8G shows a cross-sectional illustration of a high-frequency connector produced in accordance with the fourth subvariant of the second variant of the method in accordance with the present disclosure in the connected state with the associated high-frequency mating connector, FIG. 9A, 9B show an isometric illustration of a high-frequency connector produced in accordance with the third variant of the method in accordance with the present disclosure and of an associated high-frequency mating connector, FIG. 9C, 9D show two cross-sectional illustrations of a high-frequency connector produced in accordance with the third variant of the method in accordance with the present disclosure, FIG. 9E, 9F show two cross-sectional illustrations of the associated high-frequency mating connector, FIG. 9G shows a cross-sectional illustration of a high-frequency connector produced in accordance with the third variant of the method in accordance with the present disclosure in the connected state with the associated high-frequency mating connector, FIG. 10A, 10B show an isometric illustration of a high-frequency connector produced in accordance with the fourth variant of the method in accordance with the present disclosure and of an associated high-frequency mating connector, FIG. 10C, 10D show two cross-sectional illustrations of a high-frequency connector produced in accordance with the fourth subvariant of the second variant of the method in accordance with the present disclosure, FIG. 10E, 10F show two cross-sectional illustrations of the associated high-frequency mating connector, and FIG. 10G shows a cross-sectional illustration of a high-frequency connector produced in accordance with the fourth variant of the method in accordance with the present disclosure in the connected state with the associated high-frequency mating connector.

The attached figures in the drawing are intended to impart further understanding of the embodiments of the invention. They illustrate embodiments and, in connection with the description, are used to explain principles and concepts of the invention. Other embodiments and many of the mentioned advantages can be seen from the drawings. The elements in the drawings are not necessarily shown true to scale with respect to one another.

Identical, functionally identical and identically acting elements, features and components have each been provided with the same reference symbols in the figures in the drawing, where no mention is made to the contrary.

The figures will be described contiguously and comprehensively below.

DESCRIPTION OF EXEMPLARY EMBODIMENTS

In the text which follows, the principle of the method in accordance with the present disclosure for producing a high-frequency connector will be explained with reference to FIGS. 1A to 1C:

In a first manufacturing step shown in FIG. 1A, a basic body part 1 of the high-frequency connector 2 is produced from a dielectric material. The basic body part 1 has a single through-hole 4, which runs along the longitudinal axis 3. The geometry of the dielectric basic body part 1 does not necessarily need to be hollow-cylindrical, as is illustrated in FIGS. 1A to 1C for reasons of simplicity. Other geometries differing from a hollow-cylindrical geometry for the basic body part 1, for example for a high-frequency right-angle connector, are also conceivable.

Preferably, the geometry of the basic body part 1 is formed so as to be rotationally symmetrical with respect to the longitudinal axis 3 in order to realize concentricity between the inner conductor coating and the outer conductor coating of the high-frequency connector 2 with the basic body part 1 acting as insulator element. This concentricity is an essential prerequisite for optimized, in terms of high frequencies, transmission of an unbalanced high-frequency signal within the high-frequency connector. On the basis of this rotationally symmetrical basic geometry of the basic body part 1, in particular with a view to further mechanical and electrical functions and/or optimizations, additional technically expedient geometric modifications can be performed. In this case, comparatively complex technical geometries and miniaturized forms as far as into the micrometers and nanometers range can be realized by means of the use of additive manufacturing technologies in the production of the basic body part 1.

In a further manufacturing step as shown in FIG. 1B, the dielectric basic body part 1 is coated with an electrically conductive coating 5. The coating 5 completely surrounds the dielectric basic body part 1. Even in the case of comparatively complex geometric forms of the basic body part 1, the entire outer surface of the basic body part 1 is provided with an electrically conductive coating 5 without any gaps. The electrically conductive coating 5 typically contains an electrically conductive layer, i.e. a metallic layer.

When using an electrochemical coating method, the dielectric basic body part 1 needs to be coated with an electrically conductive, preferably a metallic, starting layer by means of a non-electrochemical coating method. Thereupon, the actual metallic layer is constructed onto this starting layer.

In addition, the dielectric basic body part 1 can have in each case a plurality of metallic layers over the entire surface or preferably selectively in certain regions in order to achieve particular mechanical and electrical properties by virtue of this multiple coating. There are increased mechanical and electrical requirements in particular in the contact-making regions $\mathbf{7}_{11}$ and $\mathbf{7}_{12}$ on the outer conductor side and on the inner conductor side of the high-frequency connector 2 with an associated high-frequency mating connector at the first end $\mathbf{6}_1$ of the basic body part 1. For example, an additional gold layer in the two contact-making regions $\mathbf{7}_{11}$ and $\mathbf{7}_{12}$ advantageously has the effect of increased abrasion resistance and at the same time a lower contact resistance. Increased mechanical and electrical requirements which necessitate a multilayered coating may also be present, however, in the contact-making regions $\mathbf{7}_{21}$ and $\mathbf{7}_{22}$ on the outer conductor side and on the inner conductor side at the second end $\mathbf{6}_2$ of the basic body part 1 which make contact, for example, with a further high-frequency mating connector.

In the final, third manufacturing step, as shown in FIG. 1C, the electrically conductive coating 5, which is composed of at least one metallic layer, is removed in a region $\mathbf{34}_1$ and $\mathbf{34}_2$ surrounding the through-hole 4 in each case at the first end $\mathbf{6}_1$ and at the second end $\mathbf{6}_2$, respectively, of the high-frequency connector 2. In this way, self-contained regions of the coating 5, which are each electrically isolated from one another, form on the outer surface of the basic body part 1. One region is the region on the outer lateral surface of the basic body part 1 which reaches as far as into end faces at the two ends of the basic body part 1 and forms the outer conductor of the high-frequency connector 2. The other region is the region in the through-hole 4 which reaches as far as into end faces at the two ends of the basic body part 1 and forms the inner conductor of the high-frequency connector 2. By virtue of this manufacturing step, the original coating is divided into a coating $\mathbf{5}_1$ on the outer conductor side and a coating $\mathbf{5}_2$ on the inner conductor side. A contact-making region $\mathbf{7}_{11}$ on the outer conductor side and a contact-making region $\mathbf{7}_{12}$ on the inner conductor side are formed at the first end $\mathbf{6}_1$ of the high-frequency connector 2. A contact-making region $\mathbf{7}_{21}$ on the outer conductor side and a contact-making region $\mathbf{7}_{22}$ on the inner conductor side are formed at the second end $\mathbf{6}_2$ of the high-frequency connector 2.

In this way, a high-frequency connector 2 for a high-frequency signal can be produced by means of three successive and typically automatable manufacturing steps. Individual-part manufacture for the inner conductor element, the insulator element and the outer conductor element and subsequent comparatively complex assembly are not required.

A basic structure of a connector 2 for a differential high-frequency signal is shown in FIGS. 2A and 2B. In this case, two through-holes $\mathbf{4}_1$ and $\mathbf{4}_2$, which each run from the first end $\mathbf{6}_1$ to the second end $\mathbf{6}_2$ in the longitudinal extent of the high-frequency connector 2, are formed by means of the additive manufacturing method. The coatings $\mathbf{5}_2^{\,1}$ and $\mathbf{5}_2^{\,2}$, respectively, in the two through-holes $\mathbf{4}_1$ and $\mathbf{4}_2$ are each used as inner conductor, while the coating $\mathbf{5}_1$ on the outer lateral surface forms the outer conductor. Instead of two through-holes $\mathbf{4}_1$ and $\mathbf{4}_2$, any desired and technically expedient number of through-hole pairs can be formed which have an inner coating which in each case forms the inner conductor pairs for transmitting in each case one differential high-frequency signal. The individual pairs of through-holes can be formed within the basic body part 1 either so as to intersect one another or parallel to one another.

A further embodiment of a basic structure of a high-frequency connector 2 is shown in FIG. 3. In this case, the through-hole 4 of the basic body part 1 is completely filled with coating material by means of selective coating. Alternatively, a coating within the through-hole 4 can also be realized which has a greater layer thickness in comparison with the coating $\mathbf{5}_1$ on the outer conductor side and at the same time does not completely fill the through-hole 4. Such a selective coating which has an enlarged layer thickness in the inner conductor region is primarily advantageous for transmission of a high-frequency signal in a relatively high power range.

An increased layer thickness implemented by means of selective coating in a contact-making region $\mathbf{7}_{11}$, $\mathbf{7}_{12}$, $\mathbf{7}_{21}$ and $\mathbf{7}_{22}$ of the high-frequency connector 2 makes it possible to extend the service life of a high-frequency connector which gets ever shorter owing to abrasion in the contact-making region.

FIGS. 4A, 4B, 4C, 4D, 4E, 4F and 4G relate to a high-frequency connector 2 which is produced in accordance with a first variant of the production method. In this case, a socket-shaped extension 9 of the basic body part 1 is constructed in the region of the first end $\mathbf{6}_1$ of the dielectric basic body part 1 starting from the substantially hollow-cylindrical basic body part 1 on the outer conductor side by means of the additive manufacturing method. The socket-shaped extension 9 of the basic body part 1 in this case protrudes in the direction of the longitudinal axis of the high-frequency connector beyond the end face 10 at the first end $\mathbf{6}_1$ of the basic body part.

The contact-making region $\mathbf{7}_{12}$ on the inner conductor side of a high-frequency connector 2 produced in such a way is realized by a coating $\mathbf{5}_2$ on the inner conductor side applied to the end face 10 on the inner conductor side. This contact-making region $\mathbf{7}_{12}$ on the inner conductor side forms end-face contact-making with a contact-making region $\mathbf{7}_{12}$' on the inner conductor side, which is located on an opposite end face 10' of an associated high-frequency mating connector 2'.

The contact-making region $\mathbf{7}_{11}$ on the outer conductor side of a high-frequency connector 2 produced in such a way is implemented by the coating $\mathbf{5}_1$ on the outer conductor side on the inner lateral surface of the socket-shaped extension 9 of the basic body part 1. For this purpose, preferably the coating $\mathbf{5}_1$ on the outer conductor side of the high-frequency connector 2 is guided from the outer lateral surface of the basic body part 1 via a plurality of slots 11, which are formed in the transition region 12 between the socket-shaped extension 9 and the basic body part 1 by means of the additive manufacturing method, onto the inner lateral surface of the socket-shaped extension 9. In this way, the coating $\mathbf{5}_1$ on the outer conductor side is guided over the entire longitudinal extent of the high-frequency connector 2 with the same radial spacing with respect to the longitudinal axis 3 of the high-frequency connector 2 and therefore coaxially with respect to the coating $\mathbf{5}_2$ on the inner conductor side. This contact-making region $\mathbf{7}_{11}$ on the outer conductor side forms radially directed contact-making with a contact-making region $\mathbf{7}_{11}$' on the outer conductor side, which is located on the outer lateral surface of an associated high-frequency mating connector 2'.

Electrical isolation between the contact region $\mathbf{7}_{11}$ on the outer conductor side and the contact region $\mathbf{7}_{12}$ on the inner conductor side is implemented by virtue of the fact that a region, located between the contact region $\mathbf{7}_{11}$ on the outer conductor side and the socket-shaped extension 9, of the end face 10 of the basic body part 1 is not coated.

The associated high-frequency mating connector 2' can be produced using a conventional manufacturing method. Alternatively, the high-frequency mating connector 2', as can be seen from FIGS. 4F and 4G, can also be produced in accordance with the present disclosure in an additive manufacturing method.

The high-frequency mating connector 2' produced in accordance with the present disclosure in an additive manufacturing method is in this case a high-frequency connector 2 produced in accordance with the fourth variant of the production method with end-face contact-making, which will be explained further below. The end-face contact-making is in this case restricted to contact-making on the inner conductor side via a contact-making region $\mathbf{7}_{12}$' on the inner conductor side since the contact-making on the outer conductor side is implemented by virtue of radial contact-making.

In order to improve the contact-making on the outer conductor side between the high-frequency connector 2 and the associated high-frequency mating connector 2', in a preferred development of the fourth variant of the production method of a high-frequency connector as shown in FIGS. 4F and 4G, a contact ridge 13 running radially outwards, preferably a ring-shaped contact ridge 13, is constructed on the outer lateral surface of the basic body part 1 in the region of the first end of the basic body part 1 by means of the additive manufacturing method. This contact ridge 13 running radially outwards enables approximately linear contact between the inner lateral surface of the socket-shaped extension 9 belonging to the high-frequency connector 2 and the outer lateral surface of the high-frequency mating connector 2'. In order to exert sufficient contact pressure of the contact ridge 13 running radially outwards on the inner lateral surface of the socket-shaped extension 9, that region of the basic body part 1' which is adjacent to the contact ridge 13 running radially outwards is designed to be elastic. This may be, as is illustrated in FIGS. 4F and 4G, a cavity 14 which is formed in a region of the basic body part 1' which is adjacent to the contact ridge 13 running radially outwards by means of the additive manufacturing method. Alternatively, that region of the basic body part 1' which is adjacent to the contact ridge 13 running radially outwards can also be constructed using an elastic dielectric material by means of the additive manufacturing method.

With a view to good contact-making on the outer conductor side and good mechanical guidance, the inner diameter of the socket-shaped extension 9 plus the coating $\mathbf{5}_1$ on the outer conductor side is matched to the outer diameter of the associated high-frequency mating connector 2'. The length of the socket-shaped extension 9 should be dimensioned sufficiently to likewise ensure good guidance of the high-frequency mating connector 2' in the high-frequency connector 2. The inner lateral surface of the socket-shaped extension 9 of the basic body part 1 of the high-frequency connector 2 is used not only as the contact-making region $\mathbf{7}_{11}$ on the outer conductor side, but also, in combination with the outer lateral surface of the high-frequency mating connector, as a guide region.

In a second variant of the production method, a high-frequency connector 2 is produced with a pin-shaped extension 15 on the inner conductor side. The pin-shaped extension 15 of the basic body part 1 in this case protrudes in the direction of the longitudinal axis of the high-frequency connector beyond the end face 10 at the first end $\mathbf{6}_1$ of the basic body part.

In a preferred embodiment, the pin-shaped extension on the inner conductor side has a star-shaped structure. This star-shaped structure advantageously enables multiple contact-making between the pin-shaped extension 15 on the inner conductor side and an associated primarily socket-shaped inner conductor of an associated high-frequency mating connector 2'.

FIGS. 5A, 5B, 5C, 5D, 5E, 5F and 5G relate to a high-frequency connector 2 which is produced in accordance with a first subvariant of this second variant of the production method. In the first subvariant as well as in the second subvariant explained thereafter of a pin-shaped extension 15 on the inner conductor side of the basic body part 1, in each case a plurality of lamella-shaped regions is constructed as the pin-shaped extension 15 on the basic body part 1 by means of additive manufacturing technology.

The lamella-shaped regions $\mathbf{16}_1$, $\mathbf{16}_2$, $\mathbf{16}_3$ and $\mathbf{16}_4$ of the pin-shaped extension 15 having a star-shaped structure are constructed on the basic body part 1 by means of the additive manufacturing method at the first end $\mathbf{6}_1$ of the basic body part 1 in such a way that in each case two adjacent lamella-shaped regions $\mathbf{16}_1$, $\mathbf{16}_2$, $\mathbf{16}_3$ and $\mathbf{16}_4$ each enclose an angle, preferably an identical angle. The angle results from the number n of lamella-shaped regions and corresponds to 360°/n. Therefore, the individual lamella-shaped regions within the pin-shaped extension 15 are oriented radially and therefore in the form of a star with respect to the longitudinal axis 3 of the high-frequency connector 2. The individual lamella-shaped regions $\mathbf{16}_1$, $\mathbf{16}_2$, $\mathbf{16}_3$ and $\mathbf{16}_4$ are constructed in such a way that they are connected to one another in the region of the longitudinal axis 3. By virtue of the additive construction, in each case two adjacent lamella-shaped regions $\mathbf{16}_1$, $\mathbf{16}_2$, $\mathbf{16}_3$ und $\mathbf{16}_4$ are each connected to the basic body part 1, preferably to the inner lateral surface of the hollow-cylindrical basic body part 1, spaced apart from one another at an angle of 360°/n.

By virtue of the radially directed or star-shaped construction of the individual lamella-shaped regions $\mathbf{16}_1$, $\mathbf{16}_2$, $\mathbf{16}_3$ and $\mathbf{16}_4$, a number of axial through-holes $\mathbf{17}_1$, $\mathbf{17}_2$, $\mathbf{17}_3$ and $\mathbf{17}_4$ corresponding to the number of lamella-shaped regions is formed in the pin-shaped extension 15. The entire pin-shaped extension 15 with all of its lamella-shaped regions $\mathbf{16}_1$, $\mathbf{16}_2$, $\mathbf{16}_3$ and $\mathbf{16}_4$ is coated contiguously with the coating $\mathbf{5}_2$ on the inner conductor side of the basic body part 1 via these axial through-holes $\mathbf{17}_1$, $\mathbf{17}_2$, $\mathbf{17}_3$ and $\mathbf{17}_4$.

With a view to improved contact-making, i.e. preferably hemispherical contact-making, between the pin-shaped extension 15 on the inner conductor side of the high-frequency connector 2 and a socket-shaped inner conductor of the high-frequency mating connector 2', in each case one contact ridge 18 is constructed on the end face of each lamella-shaped region $\mathbf{16}_1$, $\mathbf{16}_2$, $\mathbf{16}_3$ and $\mathbf{16}_4$. In the event of the presence of manufacturing tolerances and an axial offset or an angular offset between the high-frequency connector 2 and the high-frequency mating connector 2', the contact ridge 18 enables reliable contact-making with respect to an areal contact in an end-face segment of the individual lamella-shaped region.

The radial cross-sectional profile of each individual lamella-shaped region, i.e. the form of the side faces of each individual lamella-shaped region, should be constructed with the aid of the additive manufacturing method in such a way that, firstly, simple insertion of the pin-shaped extension 15 on the inner conductor side of the high-frequency connector 2 into the socket-shaped form on the inner conductor side of the high-frequency mating connector 2' is possible. In addition, reliable contact-making on the inner conductor side is intended to be realized. Therefore, a concavely curved form as shown in FIGS. 5A, 5C and 5G is suitable. Alternatively, a conically shaped form is also conceivable. The preferably hemispherical contact ridges 18 are in each case constructed depending on the selected form of the individual lamella-shaped regions in a section of the end face of the lamella-shaped region in which reliable contact-making is possible.

In order to exert sufficient contact pressure of the contact ridge 18 at the end face of the individual lamella-shaped regions on the socket-shaped inner conductor of the high-frequency mating connector 2', the individual lamella-shaped regions $\mathbf{16}_1$, $\mathbf{16}_2$, $\mathbf{16}_3$ and $\mathbf{16}_4$ are each designed to be elastic. Preferably, in this case through-bores 19 are formed in the individual lamella-shaped regions by means of the additive manufacturing method. Alternatively, the individual lamella-shaped regions can also be constructed using an elastic dielectric material.

In the case of a high-frequency connector 2 which is manufactured in accordance with the first subvariant of the second variant of the production method, by way of summary radial contact-making therefore takes place on the inner conductor side between the individual lamella-shaped regions $\mathbf{16}_1$, $\mathbf{16}_2$, $\mathbf{16}_3$ and $\mathbf{16}_4$ of the pin-shaped extension 15 of the basic body part 1, said regions forming the contact region $\mathbf{7}_{12}$ on the inner conductor side of the high-frequency connector 2, with a contact region $\mathbf{7}_{12}'$ on the inner conductor side of the high-frequency mating connector 2'. This contact region $\mathbf{7}_{12}'$ on the inner conductor side is located in the through-hole 4' on the inner lateral surface, provided with a coating $\mathbf{5}_2$ on the inner conductor side, of the basic body part 1' belonging to the high-frequency mating connector 2'.

In order to realize the contact region $\mathbf{7}_{11}$ on the outer conductor side of the high-frequency connector 2, the coating $\mathbf{5}_1$ on the outer conductor side is guided over a specific region of the end face 10 at the first end $\mathbf{6}_1$ of the basic body part 1. This contact-making region $\mathbf{7}_{11}$ on the outer conductor side of the high-frequency connector 2 is located in an end-face contact with an opposite contact-making region $\mathbf{7}_{11}'$ on the outer conductor side, which is constructed on the outer conductor side at the end face 10' at the first end $\mathbf{6}_1$ of the basic body part 1' belonging to the high-frequency mating connector 2'. The high-frequency mating connector 2' can be produced using conventional manufacturing technology as well as using additive manufacturing technology.

Electrical isolation between the contact region $\mathbf{7}_{11}$ on the outer conductor side and the contact region $\mathbf{7}_{12}$ on the inner conductor side is implemented by virtue of the fact that a region, located between the contact region $\mathbf{7}_{11}$ on the outer conductor side and the pin-shaped extension 15, of the end face 10 of the basic body part 1 is not coated.

The contact region $\mathbf{7}_{12}$ on the inner conductor side of the high-frequency connector 2 forms additionally, in combination with the inner lateral surface of the socket-shaped inner conductor of the high-frequency mating connector 2', the guide region of the high-frequency connector.

FIGS. 6A, 6B, 6C, 6D, 6E, 6F and 6G relate to a high-frequency connector 2 which is produced in accordance with a second subvariant, belonging to the second variant, of the production method.

In the case of the second subvariant belonging to the second variant as well, a pin-shaped extension 15' of the basic body part 1 is constructed with a star-shaped structure comprising a plurality of lamella-shaped regions 16$_1$', 16$_2$', 16$_3$' and 16$_4$' constructed in the form of a star with respect to one another with the aid of an additive manufacturing method. In contrast to the first subvariant, the contact-making between the individual lamella-shaped regions 16$_1$', 16$_2$', 16$_3$' and 16$_4$' and the inner conductor of the high-frequency connector 2' takes place laterally. For this purpose, in each case one contact ridge 18' is constructed on the two side faces of each lamella-shaped region 16$_1$', 16$_2$', 16$_3$' and 16$_4$'.

Each of these preferably hemispherical contact ridges 18' on a lamella-shaped region 16$_1$', 16$_2$', 16$_3$' and 16$_4$' of the pin-shaped extension 15' of the basic body part 1 belonging to the high-frequency connector 2 makes contact with an associated projection 20 in the lateral direction. Each individual projection 20 is constructed, by means of the additive manufacturing method, so as to protrude into the through-hole 4', starting from the hollow-cylindrical basic body part 1' of the high-frequency mating connector 2', in a region of the basic body part 1' which is adjacent to the first end 6$_1$'. The individual projections 20 are constructed in accordance with a high-frequency connector 2 which is produced in accordance with a preferred development of the fourth variant of the production method corresponding to FIGS. 6E, 6F and 6G. The individual projections are in this case constructed within the hollow-cylindrical basic body part 1' in such a way that an associated lamella-shaped region of the high-frequency connector is guided safely between in each case two adjacent projections 20.

At the same time, the individual projections are in this case constructed and formed within the hollow-cylindrical basic body part 1' in such a way that safe contact-making with the contact ridges 18 of the lamella-shaped regions, inserted adjacent in each case, of the high-frequency connector 2 is realized.

Possible forms of the individual projections 20 are radial cross sections which are either conical or concavely curved, as indicated in FIG. 6E. In order to implement sufficient contact pressure between the contact ridges 18 of the individual lamella-shaped regions of the pin-shaped extension 15' belonging to the high-frequency connector 2 of the basic body part 1 and the associated projections 20 of the high-frequency mating connector 2', an elastic design of the individual projections 20 is an option. For this purpose, the individual projections 20 can be constructed in each case using an elastic dielectric material using additive manufacturing technology. Alternatively, an elastic form of the individual projections 20, for example by means of the formation of cavities within the projections 20, is also possible.

The contact-making on the outer conductor side takes place via an end-face contact between a contact region 7$_{11}$ on the outer conductor side on the end face 10 of the high-frequency connector 2 and an opposite contact region 7$_{11}$' on the outer conductor side on the end face 10' of the high-frequency mating connector 2'.

FIGS. 7A, 7B, 7C, 7D, 7E, 7F and 7G relate to a high-frequency connector 2 which is produced in accordance with a third subvariant, belonging to the second variant, of the production method.

In the third subvariant belonging to the second variant, a pin-shaped extension 15" of the basic body part 1 is constructed with a star-shaped structure comprising a plurality of rib-shaped regions 21$_1$, 21$_2$, 21$_3$ and 21$_4$ constructed in the form of a star with respect to one another with the aid of an additive manufacturing method.

The rib-shaped regions 21$_1$, 21$_2$, 21$_3$ and 21$_4$ of the pin-shaped extension 15" having a star-shaped structure are constructed on the basic body part 1, by means of the additive manufacturing method, at the first end 6$_1$ of the basic body part 1 in such a way that in each case two adjacent rib-shaped regions 21$_1$, 21$_2$, 21$_3$ and 21$_4$ each enclose an angle, preferably an identical angle. The angle results from the number n of rib-shaped regions and corresponds to 360°/n. Therefore, the individual rib-shaped regions within the pin-shaped extension 15" are aligned radially and therefore in the form of a star with respect to the longitudinal axis 3 of the high-frequency connector 2. The individual rib-shaped regions 21$_1$, 21$_2$, 21$_3$ and 21$_4$ are constructed in such a way that they are connected to one another in the region of the longitudinal axis 3. By virtue of the additive construction, two adjacent rib-shaped regions 21$_1$, 21$_2$, 21$_3$ and 21$_4$ are connected to the basic body part 1, preferably on the inner lateral surface of the hollow-cylindrical basic body part 1, in each case spaced apart from one another at an angle of 360°/n.

The star-shaped structure of the pin-shaped extension 15" comprising the individual rib-shaped regions 21$_1$, 21$_2$, 21$_3$ and 21$_4$ forms a number of axial through-holes 22$_1$, 22$_2$, 22$_3$ and 22$_4$ corresponding to the number of rib-shaped regions. The entire pin-shaped extension 15" with all of its rib-shaped regions 21$_1$, 21$_2$, 21$_3$ and 21$_4$ is coated contiguously with the coating 5$_2$ on the inner conductor side of the basic body part 1 via these axial through-holes 22$_1$, 22$_2$, 22$_3$ and 22$_4$.

The individual rib-shaped region of the pin-shaped extension 15" of the basic body part 1 has, radially inwards and radially outwards, in each case one concavely curved end face. In each case one contact ridge 23 is constructed on the end face, directed radially outwards, of each rib-shaped region 21$_1$, 21$_2$, 21$_3$ and 21$_4$ by means of the additive manufacturing method. Radial multiple contact-making with the contact-making region 7$_{21}$' on the inner conductor side is realized on the inner lateral surface of the substantially hollow-cylindrical basic body part 1' of the high-frequency mating connector 2' via the contact ridges 23 of all of the rib-shaped regions 21$_1$, 21$_2$, 21$_3$ and 21$_4$. The high-frequency mating connector 2' can in this case be produced using conventional manufacturing technology or, as illustrated in FIGS. 7E, 7F and 7G, also in accordance with the present disclosure using additive manufacturing technology.

In order to exert sufficient contact pressure of the contact ridge 23 at the end face of the individual rib-shaped regions on the contact-making region 7$_{21}$' on the inner conductor side in the socket-shaped inner conductor of the high-frequency mating connector 2', the individual rib-shaped regions 21$_1$, 21$_2$, 21$_3$ and 21$_4$ are each designed to be elastic. In this case, through-bores 24 are preferably formed in the individual rib-shaped regions by means of the additive manufacturing method. Alternatively, the individual rib-shaped regions can also be constructed using an elastic dielectric material.

In the case of the high-frequency connector 2, which is produced in accordance with the third subvariant, belonging to the second variant, of the production method, radial contact-making is realized on the inner conductor side. Similarly to the first and second subvariants of the second variant of the production method, end-face contact-making with the high-frequency mating connector 2 is implemented on the outer conductor side.

FIGS. 8A, 8B, 8C, 8D, 8E, 8F and 8G relate to a high-frequency connector 2 which is produced in accordance with a fourth subvariant, belonging to the second variant, of the production method.

In the fourth subvariant belonging to the second variant, a pin-shaped extension 15''' of the basic body part 1 comprising a plurality of regions $\mathbf{25}_1$, $\mathbf{25}_2$, $\mathbf{25}_3$ and $\mathbf{25}_4$ in the form of spring arms is constructed on the basic body part 1 with the aid of an additive manufacturing method.

Each individual region $\mathbf{25}_1$, $\mathbf{25}_2$, $\mathbf{25}_3$ and $\mathbf{25}_4$ in the form of a spring arm of the pin-shaped extension 15''' of the basic body part 1 is formed with its main dimension in the direction of the longitudinal axis 3 of the high-frequency connector 2. The individual regions $\mathbf{25}_1$, $\mathbf{25}_2$, $\mathbf{25}_3$ and $\mathbf{25}_4$ in the form of spring arms are constructed on the basic body part 1 with an angular offset preferably on the inner lateral surface of the hollow-cylindrical basic body part 1. In this case, in each case two adjacent regions $\mathbf{25}_1$, $\mathbf{25}_2$, $\mathbf{25}_3$ and $\mathbf{25}_4$ in the form of spring arms each enclose an angle of 360°/n when the pin-shaped extension 15''' of the basic body part 1 contains a number n of regions in the form of spring arms.

Since the individual regions $\mathbf{25}_1$, $\mathbf{25}_2$, $\mathbf{25}_3$ and $\mathbf{25}_4$ in the form of spring arms of the pin-shaped extension 15''' of the basic body part 1 are not connected to one another in the region of the longitudinal axis 3 of the high-frequency connector 2, the pin-shaped extension 15''' has a single through-hole 26. The through-hole 26 enables a complete and contiguous electrically conductive coating of each individual region $\mathbf{25}_1$, $\mathbf{25}_2$, $\mathbf{25}_3$ and $\mathbf{25}_4$ in the form of a spring arm with the coating $\mathbf{5}_2$ on the inner conductor side of the substantially hollow-cylindrical basic body part 1.

In each case one contact ridge 27 is constructed on the radially outwardly directed and concavely curved end face of each region $\mathbf{25}_1$, $\mathbf{25}_2$, $\mathbf{25}_3$ and $\mathbf{25}_4$ in the form of a spring arm by means of the additive manufacturing method. Radial multiple contact-making with the contact-making region $\mathbf{7}_{21}$' on the inner conductor side is realized on the inner lateral surface of the substantially hollow-cylindrical basic body part 1' of the high-frequency mating connector 2' via the contact ridges 27 of all of the regions $\mathbf{25}_1$, $\mathbf{25}_2$, $\mathbf{25}_3$ and $\mathbf{25}_4$ in the form of spring arms. The high-frequency mating connector 2' can in this case be produced using conventional manufacturing technology or, as illustrated in FIGS. 7E, 7F and 7G, also in accordance with the present disclosure using additive manufacturing technology.

Owing to their shaping elasticity, the individual contact regions $\mathbf{25}_1$, $\mathbf{25}_2$, $\mathbf{25}_3$ and $\mathbf{25}_4$ in the form of spring arms do not additionally need to be designed to be elastic by means of the additive manufacturing method.

In addition to the radially oriented contact-making on the inner conductor side, end-face contact-making with the high-frequency mating connector 2' is realized on the outer conductor side in the high-frequency connector 2. This end-face contact-making on the outer conductor side is realized in an equivalent way to the first, second and third subvariants of the second variant of the production method.

FIGS. 9A, 9B, 9C, 9D, 9E, 9F and 9G relate to a high-frequency connector 2 which is produced in accordance with a third variant of the production method.

In the case of a high-frequency connector 2 produced in accordance with the third variant of the production method, a sleeve-shaped extension 28 of the basic body part 1 is constructed on the inner conductor side on the basic body part 1 with the aid of the additive manufacturing method. This sleeve-shaped extension 28 protrudes in the direction of the longitudinal axis beyond the end face 10 at the first end $\mathbf{6}_1$ of the basic body part 1.

This sleeve-shaped extension 28 is formed in each case with a plurality of slots at its distal end in the direction of the longitudinal axis 3 of the high-frequency connector. In this way, a spring lug is formed between in each case two adjacent slots 29. The sleeve-shaped extension 28 therefore forms a sleeve which is designed to be elastic or sprung in each case in the radial direction. For improved radial contact-making, in each case one radially outwardly directed contact ridge 30 is constructed at the distal end of each individual spring lug with the aid of the additive manufacturing method.

The sleeve-shaped extension 28 of the basic body part 1, with all of its spring lugs, is coated completely and contiguously with the coating $\mathbf{5}_2$ on the inner conductor side on the inner lateral surface of the substantially hollow-cylindrical basic body part 1. Therefore, the sleeve-shaped extension 28 forms the contact region $\mathbf{7}_{21}$ on the inner conductor side of the high-frequency connector 2.

A contact region $\mathbf{7}_{11}$ on the outer conductor side of the high-frequency connector 2 is in the form of an end-face contact region and is produced in a manner equivalent to all of the subvariants of the second variant of the production method.

The contact-making on the inner conductor side takes place between the contact-making region $\mathbf{7}_{12}$ on the inner conductor side of the high-frequency connector 2, which is formed from the individual contact ridges 30 running radially outwards on the spring lugs of the sleeve-shaped extension 28, and the contact-making region $\mathbf{7}_{12}$' on the inner conductor side on the inner lateral surface of the basic body part 1 of the high-frequency mating connector 2'. The contact-making region $\mathbf{7}_{12}$' on the inner conductor side of the high-frequency mating connector 2' is preferably formed by a step 31 on the inner lateral surface at the first end $\mathbf{6}_1$' of the basic body part 1'. The radial extent of the step 31 substantially corresponds to the wall thickness of the sleeve-shaped extension 28 at its distal end in order to thus avoid a jump in diameter on the inner conductor side in the transition region between the high-frequency connector 2 and the high-frequency mating connector 2'. Otherwise, an imperfection would be produced which impairs the transmission response of the high-frequency connector to a not inconsiderable extent.

FIGS. 10A, 10B, 10C, 10D, 10E, 10F and 10G relates to a high-frequency connector 2 which is produced in accordance with a fourth variant of the production method.

A high-frequency connector 2 produced in accordance with the fourth variant of the production method preferably makes contact with an associated high-frequency mating connector 2' on the inner conductor side and on the outer conductor side via in each case one end-face contact-making. Alternatively, only one end-face contact-making on the inner conductor side or only one end-face contact making on the outer conductor side is also possible. For this purpose, a contact-making region $\mathbf{7}_{12}$ on the inner conductor side is produced at the end face 10 at the first end $\mathbf{6}_1$ of the basic body part 1 by virtue of the coating $\mathbf{5}_2$ on the inner conductor side on the inner lateral surface of the substantially hollow-cylindrical basic body part 1 being extended as far as into a region on the inner conductor side on the end face 10. In this case, the coating $\mathbf{5}_2$ on the inner conductor side is guided so far into the end face 10 that there is a sufficiently large contact-making region $\mathbf{7}_{12}$ on the inner conductor side. With a view to extending the life of the contact-making region $\mathbf{7}_{12}$ on the inner conductor side in the end-face region, which has been subjected to a certain amount of abrasion owing to high connection cycles, the coating $\mathbf{5}_2$ on the inner conductor side in the end-face region is preferably formed with a plurality of layers or with a relatively high layer thickness. In an equivalent manner, the contact-making region $7_{11}$ on the outer conductor side is produced by virtue of the coating $5_1$ on the outer conductor side being continued from the outer lateral surface of the basic body 1 into a sufficiently large region on the outer conductor side on the end face 10.

In order to prevent an angular offset between the high-frequency connector 2 and the high-frequency mating connector 2' during end-face contact-making, in each case one sleeve-shaped or ring-shaped extension 32 of the basic body part 1 at the first end $6_1$ of the basic body part 1 is constructed on the inner conductor side and/or on the outer conductor side by means of an additive manufacturing method. In the direct vicinity of this sleeve-shaped or ring-shaped extension 32, a cavity 33 is formed in the basic body part 1 by means of an additive manufacturing method. The cavity 33 forms, with the ring-shaped or sleeve-shaped extension 32 on the end face 10, in each case one elastic termination of the basic body part 1 on the inner conductor side and on the outer conductor side. This elastic termination of the basic body part 1 can compensate for an angular offset between the two high-frequency connectors which have been inserted one inside the other. As an alternative to a ring-shaped or sleeve-shaped extension 32 of the basic body part 1, a plurality of preferably hemispherical extensions of the basic body part 1 is also possible. The plurality of preferably hemispherical extensions 32 of the basic body part 1 is in each case arranged on a circle, an ellipse or a rectangle in the outer conductor region and inner conductor region. In each case cavities 33 are formed in the basic body part 1 in the direct vicinity of the individual preferably hemispherical extensions 32 as well by means of an additive manufacturing method.

In order to compensate for an axial offset between the high-frequency connector 2 and the high-frequency mating connector 2', a socket-shaped extension 34 is fastened to one of the two high-frequency connectors. This socket-shaped extension 34 may be, for example, a sleeve produced from an electrically insulating material, which, as is indicated in FIG. 10G, is pressed onto the finished high-frequency connector in the region of the first end $6_1$ of the basic body part 1. Alternatively, a socket-shaped extension as shown in FIGS. 4C, 4D and 4G is also possible, said extension being constructed on the basic body part 1 in the region of the first end $6_1$ of the basic body part 1 by means of an additive manufacturing method. Owing to the end-face contact-making on the outer conductor side, the coating $5_1$ on the outer conductor side needs to be removed over the entire outer surface of this socket-shaped extension with the exception of the coating in the slots 11 by means of a thermal or mechanical method.

In addition to a high-frequency connector 2 having a contact region $7_{11}$ and $7_{12}$ on the outer conductor side and on the inner conductor side for simultaneous end-face contact-making on the outer conductor side and on the inner conductor side, a high-frequency connector 2 which has in each case one contact-making region for end-face contact-making only on the outer conductor side or only on the inner conductor side can also be produced by means of the fourth variant of the production method. This has already been explained above in the case of the high-frequency mating connectors 2', which are connectable with the high-frequency connectors 2 produced in accordance with all of the previously mentioned variants or subvariants of the production method (see in this regard: FIGS. 4B, 4E, 4F, 4G; 5B, 5E, 5F, 5G; 6B, 6E, 6F, 6G; 7B, 7E, 7F, 7G; 8B, 8E, 8F, 8G; 9B, 9E, 9F, 9G).

In addition to these previously mentioned embodiments based on the application of the additive manufacturing method for electrical contact-making and guidance of two high-frequency connectors which can be connected to one another, the additive manufacturing methods provide the further considerable advantage of implementing a high-frequency connector having a controlled impedance along its entire longitudinal extent. In particular the more complex geometric forms in the region of the extensions of the basic body part 1 can result in a deviation from a matched impedance. In order to compensate for this deviation from the impedance, other dielectric materials can be used in these critical regions of the basic body part 1 by means of the additive manufacturing method. The relative permittivity of these dielectric materials is changed in a suitable manner with respect to the relative permittivity of the dielectric material used in the rest of the impedance-matched regions of the basic body part 1. A changed absolute permittivity in these critical regions and therefore impedance matching over the entire longitudinal extent of the high-frequency connector 2 can also be achieved by means of suitable arrangement and suitable form of cavities in the dielectric basic body 1.

A further technical function in addition to electrical contact-making and guidance which is quite essential in the case of high-frequency connectors consists in lock technology.

For lock technology between two connectable high-frequency connectors which is realized by means of a screw connection, an external thread profile is formed on the outer lateral surface of the basic body part 1 by means of an additive manufacturing method. The coated external thread profile of the high-frequency connector 2 is screwed to an appropriately fitting internal thread profile of a union nut, which is mounted rotatably on a high-frequency mating connector 2'. The union nut with its internal thread profile can be produced using conventional manufacturing technology or else using additive manufacturing technology with subsequent metallic coating.

For a lock technology which is realized by means of a snap-action connection, one or more groove-shaped depressions are formed in the outer lateral surface of the basic body part 1 of the high-frequency connector 2, said depressions realizing a latching connection with associated latching tabs or latching hooks of the high-frequency mating connector 2'.

In addition to these embodiments of a lock technology, other lock technologies, such as, for example, a bayonet-type connection can also be realized by means of additive manufacturing technology. Finally, a magnetic connection between the high-frequency connectors with which contact is to be made is also possible by virtue of at least one magnet with a corresponding polarity being inserted in the basic body part 1 in the region of the first end $6_1$.

The above-mentioned construction principles on the basis of the additive manufacturing method for electrical contact-making and guidance of a high-frequency connector 2 are similarly applicable to the electrical contact-making and guidance of a further high-frequency mating connector, a high-frequency cable or a high-frequency signal line structure on a printed circuit board, which is connected to the high-frequency connector 2 at the second end $6_2$ of the basic body part 1.

Although the present invention has been described above completely with reference to preferred exemplary embodiments, it is not restricted to these exemplary embodiments, but can be modified in a variety of ways.

LIST OF REFERENCE SYMBOLS

1, 1' basic body part
2, 2' high-frequency connector, high-frequency mating connector
3 longitudinal axis
4, 4', $4_1$, $4_2$ through-hole
5, $5_1$, $5_2$, $5_2^{\,1}$, $5_2^{\,2}$ coating, coating on the outer conductor side and on the inner conductor side
$6_1$, $6_1'$, $6_2$ first end and second end
$7_{11}$, $7_{21}$ contact-making region on the outer conductor side of the high-frequency connector
$7_{12}$, $7_{22}$ contact-making region on the inner conductor side of the high-frequency connector
$7_{11}'$, $7_{12}'$ contact-making region on the outer conductor side and on the inner conductor side of the high-frequency mating connector
8 connecting region
9 socket-shaped extension of the basic body part
10, 10' end face
11 slot
12 transition region
13 radially outwardly running contact ridge
14 cavity
15, 15', 15'', 15'''' pin-shaped extension of the basic body part
$16_1$, $16_2$, $16_3$, $16_4$ lamella-shaped region
$16_1'$, $16_2'$, $16_3'$, $16_4'$ lamella-shaped region
$17_1$, $17_2$, $17_3$, $17_4$ axial through-hole
18, 18' contact ridge
19 through-bore
20 projection
$21_1$, $21_2$, $21_3$, $21_4$ rib-shaped region
$22_1$, $22_2$, $22_3$, $22_4$ axial through-hole
23 contact ridge
24 through-bore
$25_1$, $25_2$, $25_3$, $25_4$ region in the form of a spring arm
26 axial through-hole
27 contact ridge
28 sleeve-shaped extension of the basic body part
29 slot
30 outwardly running contact ridge
31 step
32 sleeve-shaped, ring-shaped or hemispherical extension of the basic body part
33 cavity
$34_1$, $34_2$ region with coating removed at the first and second ends

The invention claimed is:

1. A method, comprising:

providing a first connector component and a second connector component, wherein said first connector component comprises a dielectric first connector component body, a first inner conductor and a first outer conductor, said second connector component comprises a second inner conductor and a second outer conductor, said first connector component body comprises an elongate through-hole, said first connector component and said second connector component are structured such that said first connector component is mechanically engageable with said second connector component, said first connector component and said second connector component are structured such that, in an engaged state of said first connector component and said second connector component, said first inner conductor contacts said second inner conductor, said first connector component and said second connector component are structured such that, in said engaged state of said first connector component and said second connector component, said first outer conductor contacts said second outer conductor, said providing comprises forming said first connector component body, including said elongate through-hole, by an additive manufacturing process, said providing comprises depositing an electrically conductive material on at least a portion of a surface of said through-hole, and said electrically conductive material deposited on said surface of said through-hole constitutes at least a portion of said first inner conductor.

2. The method of claim 1, wherein:

said first connector component body comprises a tubular portion, said providing comprises depositing an electrically conductive material on at least a portion of an exterior surface of said tubular portion, and said electrically conductive material deposited on said exterior surface of said tubular portion constitutes at least a portion of said first outer conductor.

3. The method of claim 2, wherein:

said first connector component body comprises an engagement portion, said first connector component and said second connector component are structured such that, in said engaged state of said first connector component and said second connector component, said engagement portion engages an exterior surface of said second connector component, and an inner diameter of said engagement portion is substantially equal to an outer diameter of said tubular portion.

4. The method of claim 3, wherein:

said providing comprises depositing an electrically conductive material on at least a portion of an interior surface of said engagement portion, and said electrically conductive material deposited on said interior surface of said engagement portion constitutes at least a portion of said first outer conductor.

5. The method of claim 4, wherein:

said first connector component body comprises at least one hole, said providing comprises depositing an electrically conductive material on at least a portion of a respective interior surface of said at least one hole, and said electrically conductive material deposited on said a respective interior surface of said at least one hole electrically connects said electrically conductive material deposited on said interior surface of said engagement portion and said electrically conductive material deposited on said exterior surface of said tubular portion.

6. The method of claim 2, wherein:

said first connector component body comprises an engagement portion, and said first connector component and said second connector component are structured such that, in said engaged state of said first connector component and said second connector component, said engagement portion engagingly extends into an interior of said second connector component.

7. The method of claim 6, wherein:

said providing comprises depositing an electrically conductive material on at least a portion of at least one of an interior surface of said engagement portion and a generally outward-facing surface of said engagement portion, and said electrically conductive material deposited on said at least one of an interior surface of said engagement portion and a generally outward-facing surface of said engagement portion constitutes at least a portion of said first inner conductor.

8. The method of claim 7, wherein:

a diameter of said interior surface of said engagement portion is substantially equal to a diameter of said through-hole.

9. The method of claim 7, wherein:

a diameter of said generally outward-facing surface of said engagement portion is substantially equal to a diameter of said through-hole.

10. The method of claim 1, wherein:

said first inner conductor is an inner conductor of a first generally coaxial conductor pair, said first outer conductor is an outer conductor of said first generally coaxial conductor pair, said second inner conductor is an inner conductor of a second generally coaxial conductor pair, and said second outer conductor is an outer conductor of said second generally coaxial conductor pair.

11. The method of claim 1, wherein:

said depositing comprises depositing said electrically conductive material on substantially an entire surface of said dielectric first connector component body exposed to an ambient environment, said providing comprises removing a first portion of said electrically conductive material proximate to a first longitudinal end of said through-hole and removing a second portion of said electrically conductive material proximate to a second longitudinal end of said through-hole, said removing said first portion and said removing said second portion effects a disjoining of a first continuous region of said electrically conductive material from a second continuous region of said electrically conductive material, said first continuous region constitutes said first inner conductor, and said second continuous region constitutes said first outer conductor.

12. The method of claim 1, wherein:

an overall diameter of said first connector component is on the order of micrometers.

13. The method of claim 1, comprising:

moving said first connector component relative to said second connector component from a non-engaged state to said engaged state, wherein said first connector component and said second connector component are structured such that, in said non-engaged state, said first inner conductor is not in electrical connection with said second inner conductor.

14. The method of claim 1, wherein:

at least one of said first connector component body and said second connector component body comprises a resilient engagement portion, and said first connector component and said second connector component are structured such that, in said engaged state of said first connector component and said second connector component, said resilient engagement portion exerts a retaining force against another of said first connector component body and said second connector component body as a result of a restoring force arising from an elastic deformation of said resilient engagement portion.

15. The method of claim 1, wherein:

said first connector component body comprises a resilient portion, and said first connector component and said second connector component are structured such that, in said engaged state, said resilient portion presses said first inner conductor against said second inner conductor as a result of a restoring force arising from an elastic deformation of said resilient portion.

16. The method of claim 1, wherein:

said first connector component body comprises a resilient portion, and said first connector component and said second connector component are structured such that, in said engaged state, said resilient portion presses said first outer conductor against said second outer conductor as a result of a restoring force arising from an elastic deformation of said resilient portion.

17. The method of claim 1, wherein:

said first connector component body comprises a contact surface generally perpendicular to a longitudinal axis of said first connector component body, a portion of said first inner conductor is situated on said contact surface, and said first connector component and said second connector component are structured such that, in said engaged state, said portion of said first inner conductor abuts a portion of said second inner conductor.

18. The method of claim 1, wherein:

said first connector component body comprises a contacting surface generally perpendicular to a longitudinal axis of said first connector component body, a portion of said first outer conductor is situated on said contacting surface, and said first connector component and said second connector component are structured such that, in said engaged state, said portion of said first outer conductor abuts a portion of said second outer conductor.

19. The method of claim 18, wherein:

a portion of said first inner conductor is situated on said contact surface, and said first connector component and said second connector component are structured such that, in said engaged state, said portion of said first inner conductor abuts a portion of said second inner conductor.

* * * * *